(12) United States Patent
Steele et al.

(10) Patent No.: US 9,038,277 B2
(45) Date of Patent: May 26, 2015

(54) SHOE ACCESSORY FOR A SAW

(75) Inventors: Michael S. Steele, Waukesha, WI (US);
Timothy Kenney, Germantown, WI
(US); Steven F. Thiel, Colgate, WI (US)

(73) Assignee: Milwaukee Electric Tool Corporation,
Brookfield, WI (US)

( * ) Notice: Subject to any disclaimer, the term of this patent is extended or adjusted under 35 U.S.C. 154(b) by 489 days.

(21) Appl. No.: 12/996,286

(22) PCT Filed: Jun. 3, 2009

(86) PCT No.: PCT/US2009/046145
§ 371 (c)(1),
(2), (4) Date: Dec. 3, 2010

(87) PCT Pub. No.: WO2009/149194
PCT Pub. Date: Dec. 10, 2009

(65) Prior Publication Data
US 2011/0083330 A1  Apr. 14, 2011

Related U.S. Application Data

(60) Provisional application No. 61/058,431, filed on Jun. 3, 2008.

(51) Int. Cl.
*B23D 49/10* (2006.01)
*B23D 51/10* (2006.01)
*B23D 49/16* (2006.01)
*B23D 51/02* (2006.01)
(Continued)

(52) U.S. Cl.
CPC .............. *B23D 49/167* (2013.01); *B23D 49/10* (2013.01); *B23D 51/10* (2013.01); *B23D 51/02* (2013.01); *B23D 53/12* (2013.01); *B23D 55/00* (2013.01)

(58) Field of Classification Search
CPC ......... B23D 51/16; B23D 51/10; B23D 49/10
USPC .................... 30/370, 371, 374, 375, 392–394
See application file for complete search history.

(56) References Cited

U.S. PATENT DOCUMENTS 1,542,127 A * 6/1925 Hastings ........................ 30/394
2,722,244 A * 11/1955 Schultz ........................... 30/394
(Continued)

FOREIGN PATENT DOCUMENTS

JP  04053620 A * 2/1992

OTHER PUBLICATIONS

PCT/US2009/046145 International Search Report and Written Opinion dated Sep. 17, 2009 (10 pages).
(Continued)

*Primary Examiner* — Jason Daniel Prone
(74) *Attorney, Agent, or Firm* — Michael Best & Friedrich LLP

(57) ABSTRACT

An accessory for a reciprocating saw, having a blade configured to cut a workpiece and a shoe including a guiding surface for engaging the workpiece, includes a body having a first face and a second face opposite the first face. The body includes a member proximate the second face for coupling the accessory to the shoe. A guiding surface is defined on the first face of the body for engaging a workpiece and an opening is formed in the body for receiving the blade. The guiding surface constitutes a modified surface configured to differ from the guiding surface of the shoe by at least one characteristic.

19 Claims, 19 Drawing Sheets

(51) Int. Cl.
*B23D 53/12* (2006.01)
*B23D 55/00* (2006.01)

(56) References Cited

U.S. PATENT DOCUMENTS

| | | | | |
|---|---|---|---|---|
| 3,360,021 | A * | 12/1967 | Mejia | 30/392 |
| 3,528,463 | A * | 9/1970 | Mejia | 30/392 |
| 3,707,768 | A * | 1/1973 | Spengler | 30/392 |
| 3,802,079 | A * | 4/1974 | Ketchpel et al. | 30/394 |
| 4,385,443 | A * | 5/1983 | O'Banion | 30/393 |
| 4,550,501 | A * | 11/1985 | Moores et al. | 30/393 |
| 4,665,617 | A * | 5/1987 | Maier et al. | 30/374 |
| 5,185,934 | A * | 2/1993 | Tillman | 30/392 |
| 5,421,091 | A * | 6/1995 | Gerritsen, Jr. | 30/392 |
| 5,607,265 | A * | 3/1997 | Lane | 30/392 |
| 5,644,847 | A * | 7/1997 | Odendahl et al. | 30/394 |
| 5,724,741 | A * | 3/1998 | Bednar | 30/392 |
| 5,755,293 | A * | 5/1998 | Bourke | 30/392 |
| 5,855,070 | A * | 1/1999 | Grabowski | 30/392 |
| 6,317,988 | B1 * | 11/2001 | Tachibana et al. | 30/392 |
| 6,349,712 | B1 * | 2/2002 | Halstead | 30/371 |
| 6,553,669 | B2 * | 4/2003 | Carter | 30/371 |
| 6,820,339 | B2 * | 11/2004 | Albrightson | 30/392 |
| 7,082,689 | B2 * | 8/2006 | Beville et al. | 30/392 |
| 7,658,012 | B2 * | 2/2010 | James et al. | 30/392 |
| 7,963,043 | B2 * | 6/2011 | Chen | 30/392 |
| 7,971,362 | B2 * | 7/2011 | Haas et al. | 30/392 |
| 8,146,258 | B2 * | 4/2012 | Shafer | 30/392 |
| 8,161,655 | B2 * | 4/2012 | Fuchs | 30/392 |
| 8,220,165 | B2 * | 7/2012 | Gadams | 30/392 |
| 8,230,605 | B2 * | 7/2012 | Oberheim | 30/392 |
| 2002/0059732 | A1 | 5/2002 | Campbell et al. | |
| 2005/0102846 | A1 * | 5/2005 | Breazeale, Jr. | 30/392 |
| 2005/0252011 | A1 | 11/2005 | Neumeier | |
| 2006/0048763 | A1 * | 3/2006 | Burke | 125/14 |
| 2009/0151174 | A1 * | 6/2009 | Steingruber et al. | 30/394 |
| 2011/0010951 | A1 * | 1/2011 | Harrison et al. | 30/394 |

OTHER PUBLICATIONS

FESTO, Festo PS 200 E, image of circle guide for jigsaw, available since at least Jun. 3, 2008, (1 page).
HILTI, Additional Shoe Accessory Concepts brochure, available since at least Jun. 3, 2008, (4 pages).
HILTI, Hilti WSR 36-A, cordless reciprocating saw, 3 references, Jan. 2008, (4 pages).

* cited by examiner

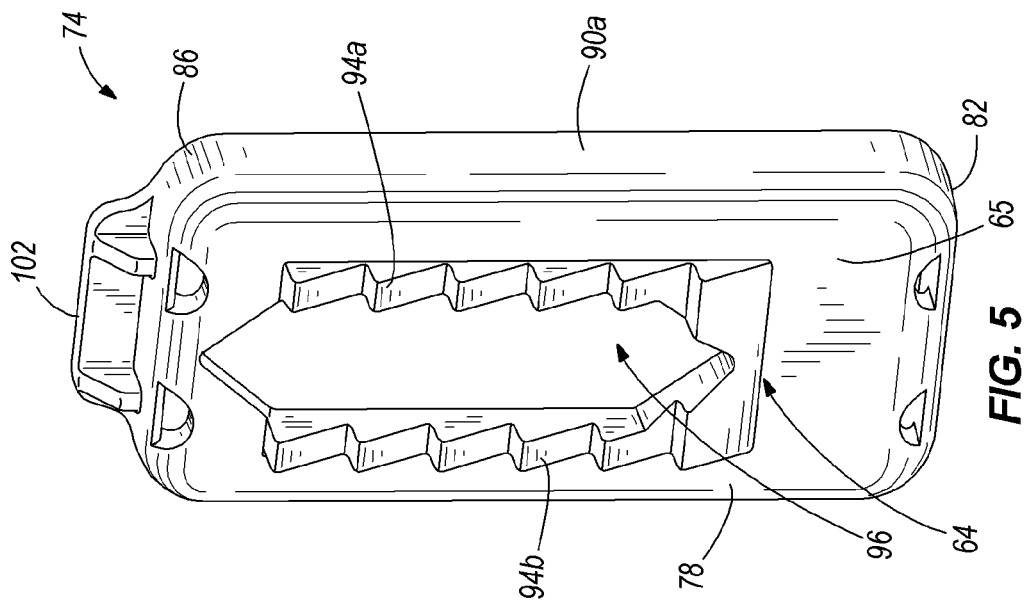
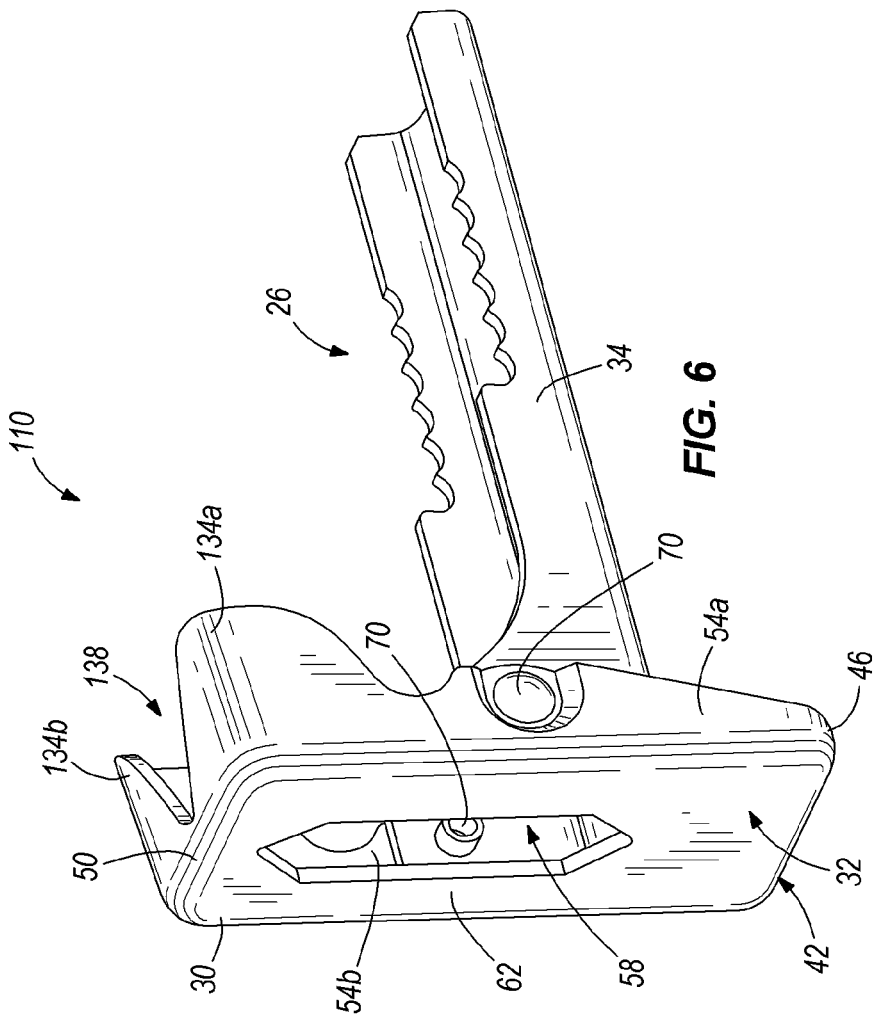

SHOE ACCESSORY FOR A SAW

BACKGROUND

The present invention relates to a shoe accessory for a saw, and, more particularly, to an accessory for a reciprocating saw shoe and an accessory for a band saw shoe.

Shoes for reciprocating saws typically include a flat or planar surface for engaging a workpiece. The planar surface is positioned normal to a blade of the reciprocating saw. The reciprocating saw is held by a user and positioned by the user with respect to the workpiece. The shoe does not aid in locating the tool with respect to the workpiece, but acts as a stop to limit the depth of the saw blade into the workpiece and to prevent the workpiece from engaging the saw blade at a connection of the saw blade to the tool.

Band saw shoes, or workpiece bumpers, typically include a flat or planar surface for engaging a workpiece. The flat surface lies normal to a portion of a saw blade located in a cut zone of the saw where the workpiece is cut. As such, a band saw shoe guides the workpiece with respect to the tool such that a perpendicular cut is made through the workpiece.

SUMMARY

In one embodiment, the invention provides an accessory for a reciprocating saw having a blade configured to cut a workpiece and a shoe including a guiding surface for engaging the workpiece. The accessory includes a body having a first face and a second face opposite the first face, the body including a member proximate the second face for coupling the accessory to the shoe. A guiding surface is defined on the first face of the body for engaging a workpiece, and an opening is formed in the body for receiving the blade. The guiding surface constitutes a modified surface configured to differ from the guiding surface of the shoe by at least one characteristic.

In another embodiment, the invention provides a power tool including a main body having a motor configured to transfer motion to a cutting blade and a shoe extending from the main body. The shoe includes a first guiding surface for engaging a workpiece and an opening through which the cutting blade passes. The power tool also includes a shoe accessory removably coupled to the shoe. The shoe accessory includes a rear surface facing the first guiding surface of the shoe and a second guiding surface opposite the rear surface and for engaging the workpiece. The second guiding surface has at least one characteristic that differs from the first guiding surface.

In yet another embodiment, the invention provides an accessory for a reciprocating saw having a shoe. The accessory includes a body having a first face and a second face opposite the first face, the body for coupling to the shoe wherein the body covers a guiding surface of the shoe. A guiding surface of the body is defined by the first face of the body and for engaging a workpiece, wherein the guiding surface of the body provides a modified surface that differs from the guiding surface of the shoe. The accessory includes an opening formed in the body for receiving a blade of the reciprocating saw and a projection formed on the second face of the body for coupling the accessory to the shoe by abutting a portion of the shoe.

In still another embodiment, the invention provides a power tool including a main body having a motor configured to transfer motion to a cutting blade, a shoe extending from the main body, and a shoe accessory removably coupled to the shoe. The shoe includes a first guiding surface for engaging a workpiece and a first opening through which the cutting blade passes. The shoe accessory includes a rear surface facing the first guiding surface of the shoe, a second guiding surface opposite the rear surface and for engaging the workpiece, the second guiding surface having at least one characteristic that differs from the first guiding surface, a second opening through which the cutting blade passes, the second opening configured to align with the first opening when the shoe accessory is coupled to the shoe, and a projection formed on the rear face of the accessory for coupling the accessory to the shoe by abutting a portion of the shoe.

In one embodiment, the invention provides an accessory guide for a reciprocating saw. The accessory guide includes a shaft having a first end and a second end, an attachment portion at the first end of the shaft, the attachment portion for coupling the shaft to the reciprocating saw, and a positioning portion rotatably coupled to the second end of the shaft. The positioning portion includes a first guide member having a first flange with first and second guide surfaces positioned substantially perpendicular to each other, the first flange for engaging an edge of a workpiece, and a second guide member having a second flange defining a pivot point about which a circular cut is made.

In another embodiment, the invention provides a reciprocating saw including a main body including a motor configured to transfer motion to a cutting blade, a shoe extending from the main body, and an accessory guide removably coupled to the shoe. The accessory guide includes a shaft having a first end and a second end, an attachment portion at the first end of the shaft and coupled to the shoe, and a positioning portion rotatably coupled to the second end of the shaft. The positioning portion includes a first guide member having a first flange with first and second guide surfaces substantially perpendicular to each other, the first flange for engaging an edge of a workpiece, and the positioning portion having a second guide member including an aperture configured to define a pivot point about which a circular cut is made.

In yet another embodiment, the invention provides an angle guide for a band saw. The angle guide includes a guide body for coupling to the band saw, a first engaging surface of the body for engaging a workpiece during a cutting operation of the band saw, the first engaging surface defining a first plane, a second surface of the body defining a second plane, wherein the second plane is substantially non-parallel to the first plane, and a tool side edge of the body for being positioned adjacent the band saw, the tool side edge defining a third plane, wherein a cut angle is defined by an angle between the first plane and the third plane.

In still another embodiment, the invention provides a band saw including a continuous saw blade, a motor operable to drive the continuous saw blade to cut a workpiece, a frame that supports the motor, and a workpiece bumper coupled to the frame and including a slot that the blade passes through. The workpiece bumper includes a first engaging surface defining a first plane, wherein the first engaging surface is generally perpendicular to the blade as the blade passes through the slot. The band saw also includes an angle guide coupled to the workpiece bumper. The angle guide includes a second engaging surface for engaging a workpiece during a cutting operation of the band saw, the second engaging surface defining a second plane, and a third surface defining a third plane wherein the third plane is non-parallel to the second plane. A cut angle is defined by an angle between the second plane and the first plane.

Other aspects of the invention will become apparent by consideration of the detailed description and accompanying drawings.

BRIEF DESCRIPTION OF THE DRAWINGS

FIG. 5 is a front perspective view of the shoe accessory of FIG. 2.

FIG. 6 is a front perspective view of a shoe assembly according to another embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
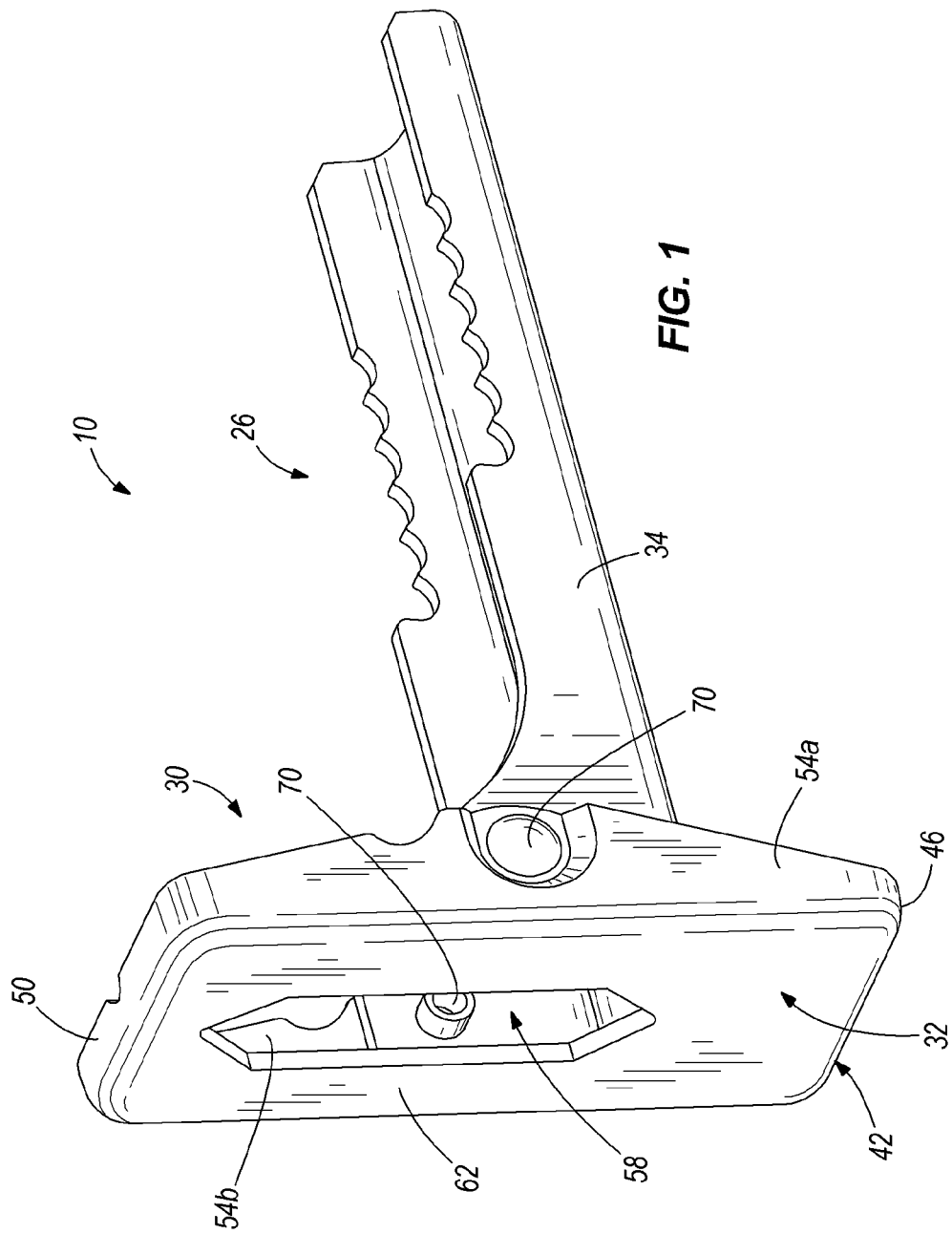
FIG. 1 is a front perspective view of a shoe assembly for a reciprocating saw.

FIG. 1 illustrates a shoe assembly 10 for use with a tool 14, such as a reciprocating saw. The reciprocating saw 14 (FIGS. 8-11) generally includes a main body 18 having an electric motor (not shown) provided with power via an electric cord (an AC version) or a battery pack (a DC version). The motor provides reciprocating motion to a reciprocating spindle by a mechanical arrangement (not shown) to reciprocate a saw blade 22.

The shoe assembly 10 includes a shoe support 26 and a shoe 30. The shoe assembly 10 is secured relative to the main body 18 of the reciprocating saw 14 and provides a guiding surface 32 for resting the tool 14 against a workpiece (not shown) during cutting operations. The shoe support 26 includes a longitudinally-extending post 34 that is at least partially disposed within an orifice 38 of the main body 18 of the tool 14 (FIGS. 8-11). In some embodiments, the shoe support 26 is axially movable relative to the main body 18 of the tool 14. The shoe 30 is mounted on the shoe support 26 relative to the main body 18.

As shown in FIG. 1, the shoe 30 includes a main portion 42, a bottom wall 46, a top wall 50, and side walls 54a, 54b. The main portion 42 includes an opening 58 sized and shaped to receive the saw blade 22. The opening 58 may be any shape configured to receive the saw blade 22. The main portion 42 further includes a workpiece side 62, which defines the guiding surface 32 and is positioned proximate the workpiece, and a tool side 66 (FIG. 3) opposite the workpiece side 62. The sidewalls 54a, 54b are connected to the shoe support 26 by fasteners 70, such as rivets. In other embodiments, the shoe may be pivotally connected to the shoe support by similar fastening mechanisms. In such embodiments, the pivoting shoe allows the saw blade to be positioned at a range of angles relative to the workpiece.

The shoe 30 provides the guiding surface 32 (e.g., workpiece side 62 of the main portion 42) for using the shoe assembly 10 in relation to the workpiece. In the illustrated embodiment, the guiding surface 32 is flat or planar. The bottom wall 46 is located on one end of the main portion 42 opposite the top wall 50. The bottom wall 46 provides an additional surface to enable positioning of the shoe assembly 10 against the workpiece. The top wall 50 extends in a direction toward the tool 14 to provide a grip for a user. The top wall 50 allows the user to grip the shoe 30 at the top wall 50 and enable better positioning of the tool against the workpiece. The shoe 30 is manufactured of metal; however, in other embodiments, the shoe may be manufactured from plastic or similar material. The shoe 30 is manufactured via stamping; however, in other embodiments, the shoe may be molded or formed from other manufacturing methods.

A shoe accessory 74 for use with the shoe assembly 10 is illustrated in FIGS. 2-5. The shoe accessory 74 snaps on or otherwise couples to the shoe 30 of the shoe assembly 10 and surrounds the workpiece side 62 of the shoe 30 (i.e., covers the guiding surface 32 of the shoe 30 such that in operation only the shoe accessory 74 engages the workpiece). The shoe accessory 74 includes a main body, or main portion 78, a bottom wall 82, a top wall 86, and sidewalls 90a, 90b, which function similarly to the main portion 42, bottom wall 46, top wall 50, and sidewalls 54a, 54b of the shoe 30. The top wall 86 extends rearward from a top edge of the main portion 78, the bottom wall 82 extends rearward from a bottom edge of the main portion 78, and the pair of side walls 90a, 90b extends rearward from opposite side edges of the body between the bottom and top walls 82, 86.

The shoe accessory 74 provides a modified guiding surface 64 for engaging the workpiece that differs from the guiding surface 32 provided by the shoe 30 by at least one characteristic, as will be explained in greater detail below. The shoe accessory 74 is formed of plastic to prevent burring or other marking of the workpiece. However, in other embodiments, the shoe accessory may be comprised of metal or similar material. The shoe accessory is formed by molding or other manufacturing methods.

Figure 2:
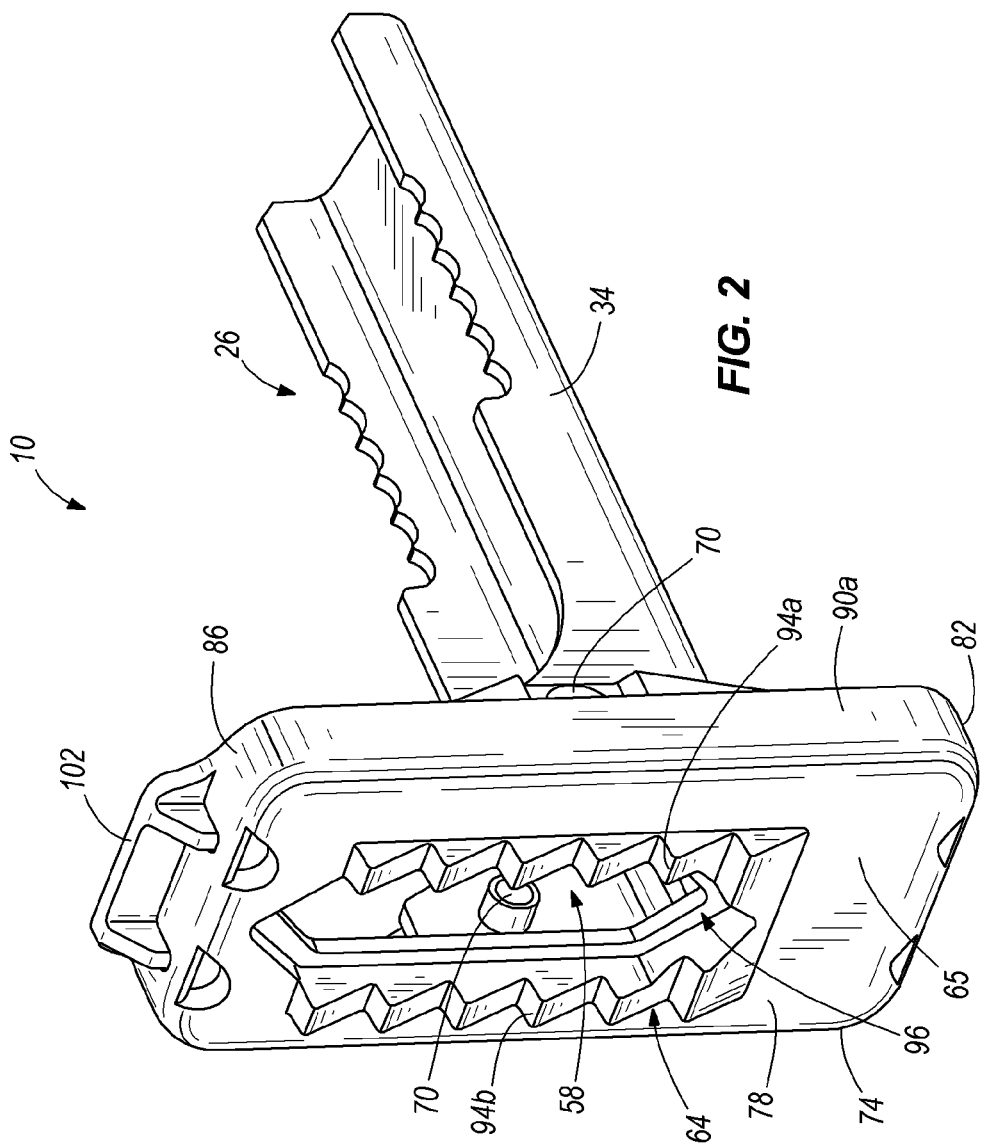
FIG. 2 is a front perspective of the shoe assembly of FIG. 1 including a shoe accessory according to one embodiment of the invention.

As shown in FIGS. 2 and 5, the shoe accessory 74 includes a first row of notches or teeth 94a and a second row of notches or teeth 94b on a workpiece side or face 65 of the main portion 78. The workpiece face 65 is opposite a tool side 68 (FIG. 4) of the shoe accessory 74. The tool side 68 includes a rear surface that faces the guiding surface 32 of the shoe 30. The rows of teeth 94a, 94b are positioned adjacent an opening 96 formed in the main portion 78. The opening 96 corresponds to and aligns with the opening 58 of the shoe 30 to allow the saw blade 22 to pass through. The teeth 94a, 94b are configured to grip the workpiece being cut by the saw blade 22. The rows of teeth 94a, 94b constitute a characteristic that distinguishes the guiding surface 64 provided by the accessory 74 from the guiding surface 32 provided by the shoe 30. Thus, the shoe accessory 74 provides a modified guiding surface. In other embodiments, the shoe accessory may include fewer or more teeth. The teeth 94a, 94b are shown as extending the length of the opening 96. However, in other embodiments, the row of teeth may not extend the full length of the opening, such as for example, but not limited to, a row of teeth extending only half of the length of the opening. In still other embodiments, the row of teeth may extend the width of the opening, such as for example, along the top and bottom of the opening. In still other embodiments, the teeth may be positioned at other locations on the workpiece face 65.

Figure 4:
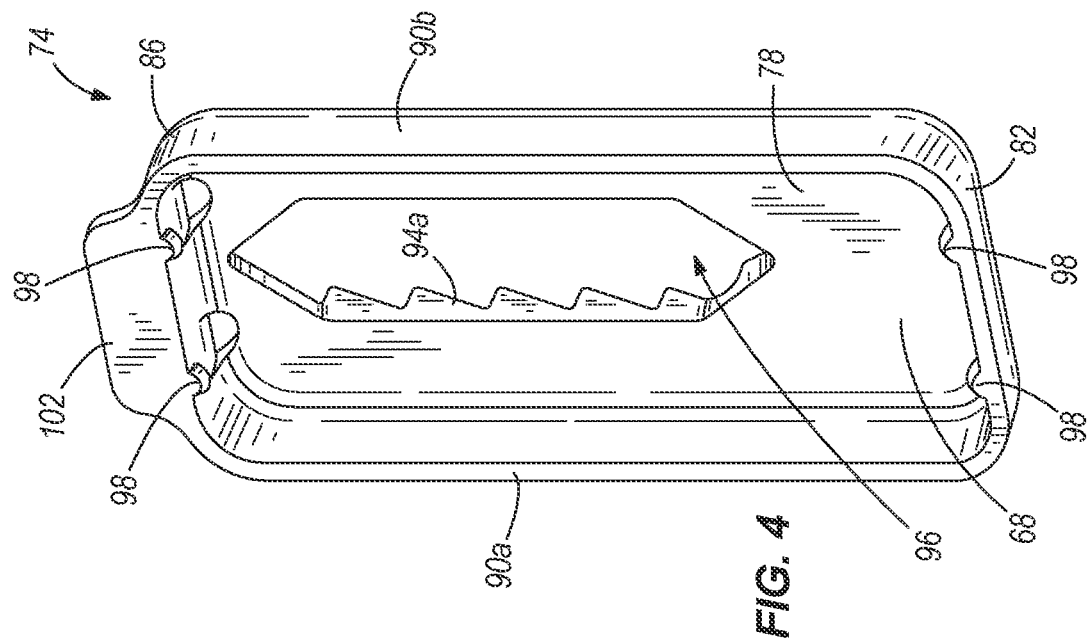
FIG. 4 is a rear perspective view of the shoe accessory of FIG. 2.
Figure 3:
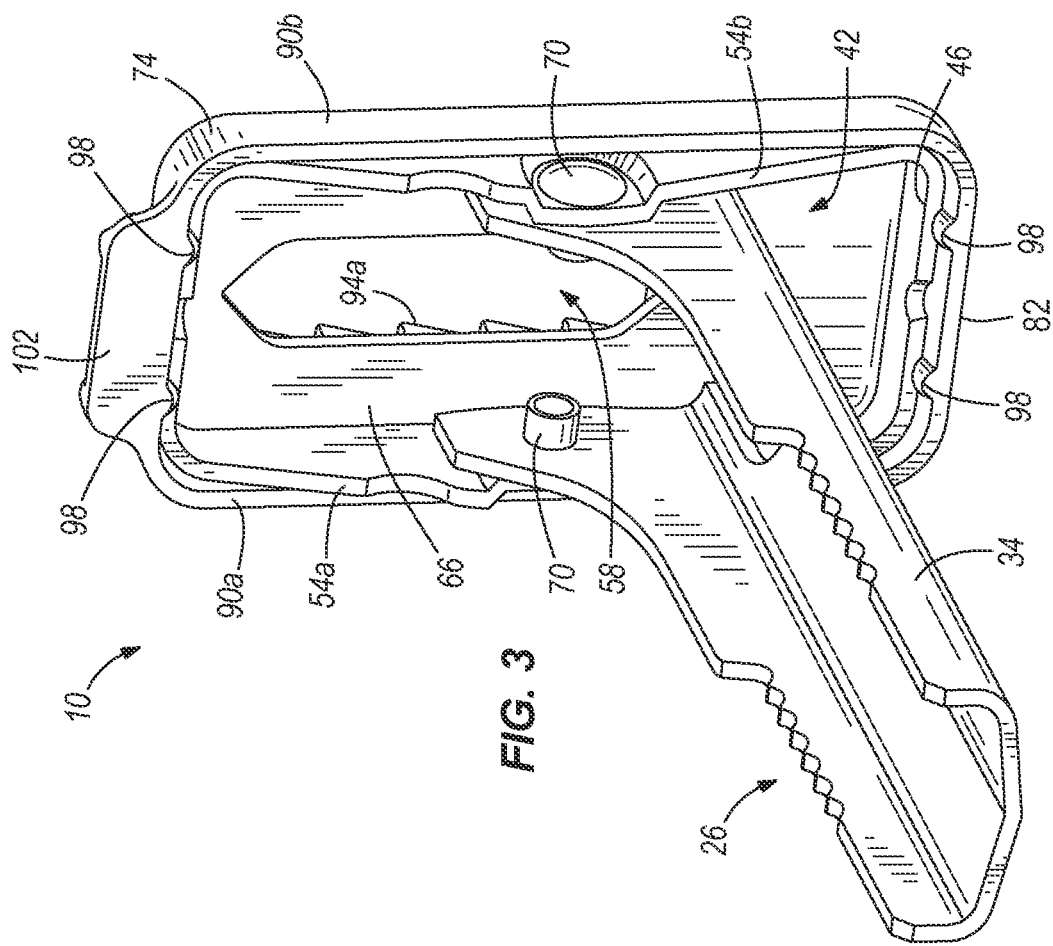
FIG. 3 is a rear perspective view of the shoe assembly of FIG. 2.

FIG. 4 shows a rear perspective view of the shoe accessory 74, including a pair of projections 98 extending away from each of the top wall 86 and the bottom wall 82 (i.e., extending towards the opposite wall). The projections 98 retain the shoe accessory 74 on the shoe 30 by abutting an edge surface of the bottom wall 46 and the top wall 50 of the shoe 30 (FIG. 3). The shoe accessory 74 also includes a grip extension 102 extending upwardly from the top wall 86 (i.e., away from the bottom wall 82). The grip extension 102 provides a grip location for a user when coupling and decoupling the shoe accessory 74 from the shoe 30, as well as when manipulating the shoe assembly 10 during use.

FIG. 6 shows a shoe assembly 110 for a reciprocating saw 14 according to another embodiment of the invention. The shoe assembly 110 shown in FIG. 6 includes similar structure to the shoe assembly 10 illustrated in FIGS. 1-3 and described above; therefore, like structure is identified by the same reference numeral. The shoe 30 of the shoe assembly 110 includes main portion 42, bottom wall 46, top wall 50, and sidewalls 54a, 54b. The shoe 30 further includes extensions 134a, 134b extending rearward from the shoe 30 (i.e., away from the workpiece face 62) at intersections between the top wall 50 and the respective sidewall 54a, 54b. A V-shaped notch 138 is positioned between the extensions 134a, 134b, and provides an additional grip location for the user to grip and manipulate the tool 14 or the shoe assembly 110.

Figure 7:
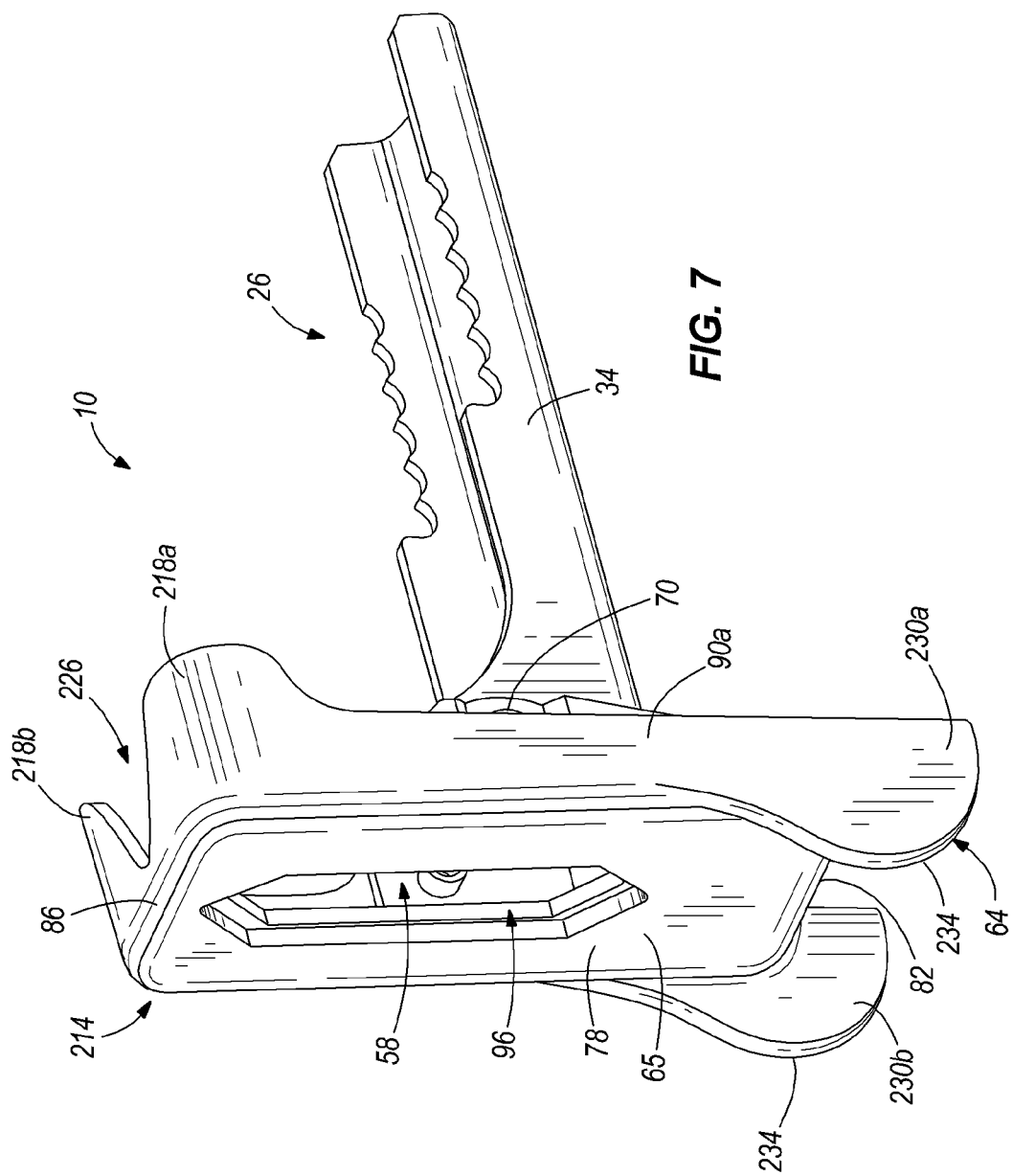
FIG. 7 is a front perspective view of the shoe assembly of FIG. 1 including a shoe accessory according to another embodiment of the invention.

FIG. 7 illustrates the shoe assembly 10 of FIG. 1 including a shoe accessory 214 according to another embodiment of the invention. The shoe accessory 214 shown in FIG. 7 includes similar structure to the shoe accessory 74 illustrated in FIGS. 2-5 and described above; therefore, like structure is identified by the same reference numeral. The shoe accessory 214 includes the main portion 78, bottom wall 82, top wall 86, sidewalls 90a, 90b, and opening 96. Extensions 218a, 218b extend rearward from the shoe accessory 214, and away from the workpiece face 65, at the intersections between the top wall 86 and the respective sidewalls 90a, 90b. A V-shaped notch 226 is positioned between the extensions 218a, 218b and provides an additional grip location for the user to grip and manipulate the tool 14 or the shoe assembly 10.

The shoe accessory 214 also includes two rounded or curved segments 230a, 230b that extend downwardly from the bottom wall 82 and outwardly, or forwardly, from the face 65 at the respective sidewalls 90a, 90b. That is, the sidewalls 90a, 90b extend downwardly from the bottom wall 82 of the main portion 78 to define the curved segments 230a, 230b. The segments 230a, 230b provide an additional grip location for the user and a pivot surface 234 (i.e., modified guiding surface 64) to position the shoe assembly 10 against the workpiece. The segments 230a, 230b constitute a characteristic that distinguishes the guiding surface 64 provided by the accessory 214 from the guiding surface 32 provided by the shoe 30. Thus, the shoe accessory 214 provides a modified guiding surface. In other constructions, the shoe accessory 214 may include only the extensions 218a, 218b or the segments 230a, 230b.

Figure 8:
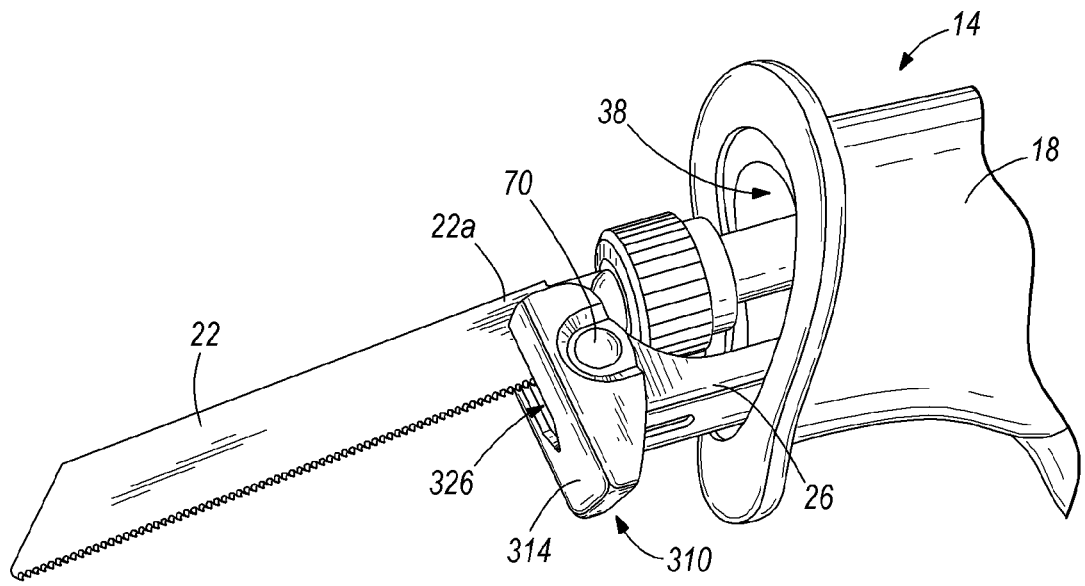
FIG. 8 is a perspective view of a portion of a reciprocating saw having a shoe assembly according to another embodiment of the invention.

FIG. 8 illustrates a shoe assembly 310 for a reciprocating saw 14 according to another embodiment of the invention. The shoe assembly 310 shown in FIG. 8 includes similar structure to the shoe assemblies 10 and 110 illustrated in FIGS. 1-3 and 6, respectively, and described above; therefore, like structure is identified by the same reference numeral. The shoe assembly 310 includes a shoe 314 coupled to the shoe support 26 by fastener 70. The shoe 314 has a generally U-shaped slot 326 that receives the saw blade 22. The saw blade 22 extends through the slot 326 with a top portion 22a of the saw blade 22 extending above the shoe 314. The configuration of shoe 314 allows for close cutting operations in which the saw blade 22 and the main body 18 are positioned near the workpiece. In other embodiments, the features of the shoe accessories discussed above may be incorporated into a shoe accessory for use with shoe 314.

Figure 9:
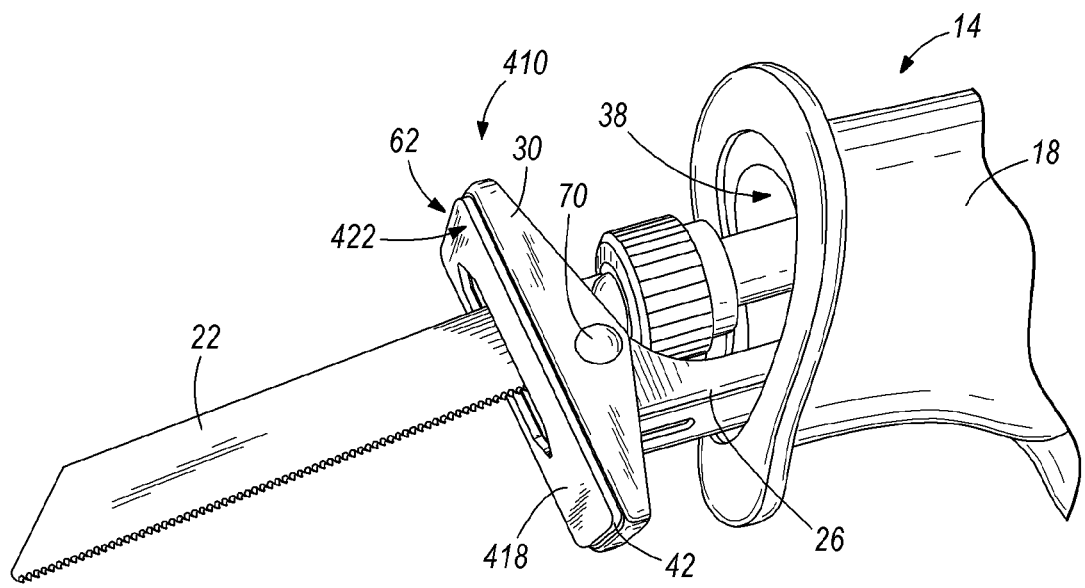
FIG. 9 is a perspective view of a portion of a reciprocating saw having a shoe assembly according to another embodiment of the invention.

FIG. 9 illustrates a shoe assembly 410 for the reciprocating saw 14 according to another embodiment of the invention. The shoe assembly 410 shown in FIG. 9 includes similar structure to the shoe assemblies 10 and 110 illustrated in FIGS. 1-3 and 6, respectively, and described above; therefore, like structure is identified by the same reference numeral. The shoe assembly 410 includes the shoe 30 having a cover layer 418 positioned on the workpiece side 62 of the main portion 42. The cover layer 418 is made of plastic to prevent marring of the workpiece surface. However, in other embodiments, the cover layer is made of rubber or any suitable material known in the art. The cover layer 418 provides a modified guiding surface 422 to position the shoe assembly 410 against the workpiece and prevents marking on the workpiece.

Figure 10:
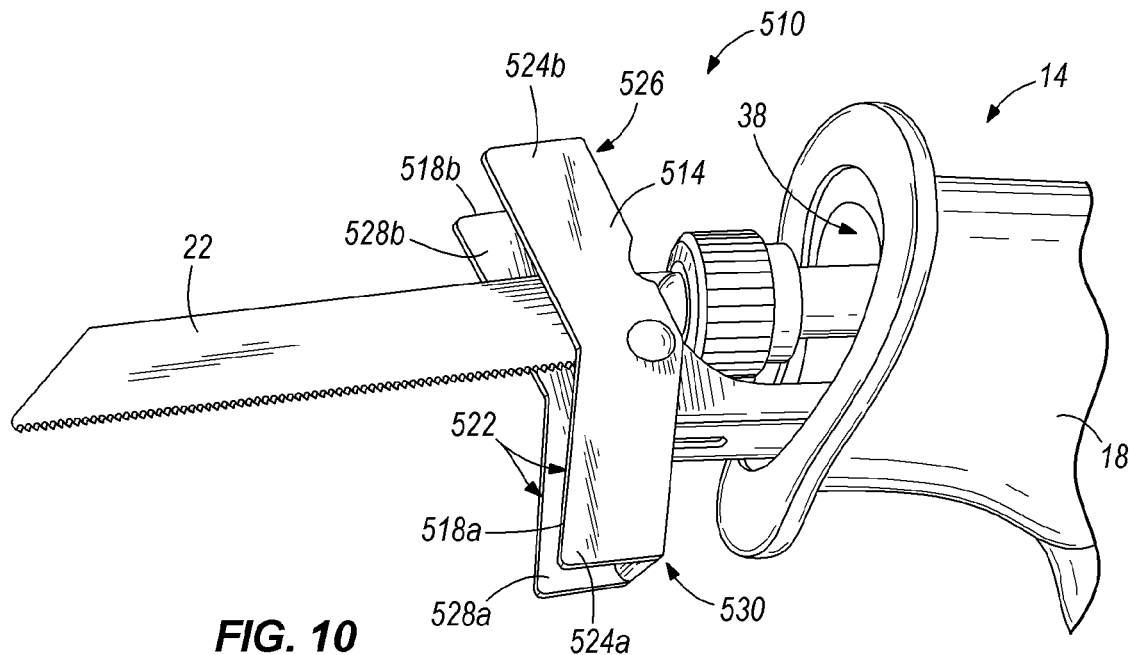
FIG. 10 is a perspective view of a portion of a reciprocating saw having a shoe assembly according to another embodiment of the invention.

FIG. 10 illustrates a shoe assembly 510 for the reciprocating saw 14 according to another embodiment of the invention. The shoe assembly 510 shown in FIG. 10 includes similar structure to the shoe assemblies 10 and 110 illustrated in FIGS. 1-3 and 6, respectively, and described above; therefore, like structure is identified by the same reference numeral. Shoe assembly 510 includes a shoe 514 having V-shaped sidewalls 518a, 518b that extend from a workpiece side to define a guiding surface 522 of the shoe 514. The sidewalls 518a, 518b extend from a top side 526 to a bottom side 530 of the shoe 514 and legs 524a, 524b and 528a, 528b of each sidewall 518a, 518b are oriented at an angle with respect to each other. In the illustrated construction, the legs 524a, 524b and 528a, 528b of each of the sidewalls 518a, 518b are angled approximately 120 degrees apart. In other constructions, the legs 524a, 524b and 528a, 528b may be oriented non-parallel to one another at an angle less than 180 degrees. The V-shaped sidewalls 518a, 518b are configured to center a pipe, or other workpiece having a curved surface, on the guiding surface 522 between the legs 524a, 524b and 528a, 528b during the cutting operation by engaging the workpiece. In other embodiments, the sidewalls may be rounded or have another shape configured for providing a centering or similar positioning function. In other embodiments, the features of the shoe 514 may be incorporated into a shoe accessory for use with the shoe 30.

Figure 11:
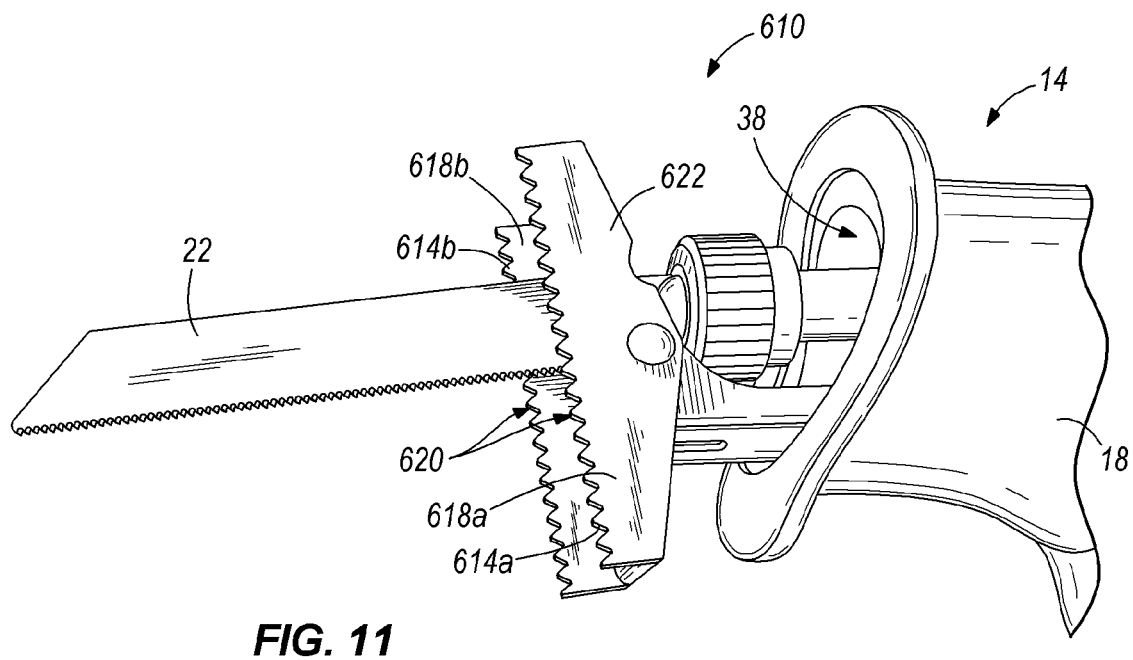
FIG. 11 is a perspective view of a portion of a reciprocating saw having a shoe assembly according to another embodiment of the invention.

FIG. 11 illustrates a shoe assembly 610 for the reciprocating saw 14 according to another embodiment of the invention. The shoe assembly 610 shown in FIG. 11 includes similar structure to the shoe assemblies 10 and 110 illustrated in FIGS. 1-3 and 6, respectively, and described above; therefore, like structure is identified by the same reference numeral. Shoe assembly 610 includes a shoe 622 having substantially parallel sidewalls 618a, 618b that extend away from a workpiece side to define a guiding surface 620 of the shoe 622. The sidewalls 618a, 618b include notches or teeth 614a, 614b having pointed peaks. The teeth 614a, 614b are configured to grip the workpiece material. In other embodiments, the shoe accessory may only have one sidewall with teeth. In alternate embodiments, the teeth may be larger or smaller. The teeth may also include more space between adjacent teeth. In other embodiments, the features of shoe 622 may be incorporated into a shoe accessory for use with the shoe 30.

The shoe accessories are configured to be useable with existing shoe assemblies for tools, such as reciprocating saws. Additionally, the shoe accessories are configured to be interchangeable with the same shoe assembly to perform various cutting operations depending on the characteristics of the guiding surface of the shoe accessory. Accordingly, multiple saw shoe accessories may be used with the same reciprocating saw for various cutting purposes. In other embodiments, the entire shoe 30 may be made interchangeable from the shoe support 26 and various shoes, such as the shoes described above and other shoes, may be replaceable.

Figure 12:
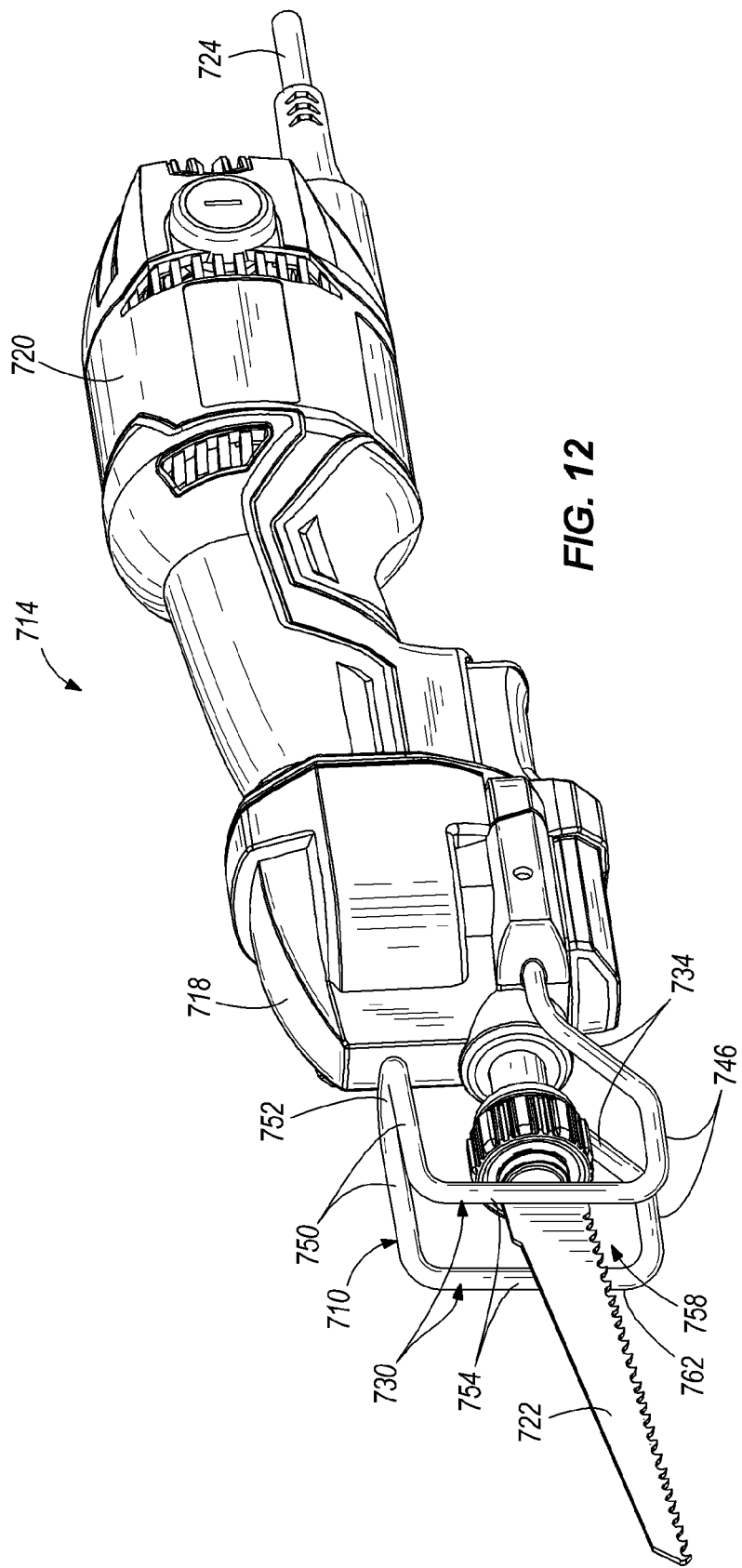
FIG. 12 is a front perspective view of a reciprocating saw having a shoe assembly.

FIG. 12 illustrates another tool 714, such as a reciprocating saw, having a wire frame shoe 710. The tool 714 generally includes a main body 718 having an electric motor 720 provided with power via an electric cord 724, and in further embodiments by a battery pack. The illustrated tool 714 is an AC version having the electrical cord connection 724; however, in further embodiments, DC versions of the tool 714 including a rechargeable, removable battery pack are possible. The electric motor 720 provides reciprocating motion to a reciprocating spindle by a mechanical arrangement (not shown) to reciprocate a saw blade 722.

The wire frame shoe 710 is preferably formed from a metal pipe or wire by bending. Preferably, a single pipe or wire is bent to form the shoe 710. The shoe 710 is secured relative to the main body 718 of the tool 714 and provides a guiding surface 730 for resting the tool 714 against a workpiece (not shown) during cutting operations. The shoe 710 includes longitudinally-extending posts 734 at least partially disposed within the main body 718 of the tool 714 for coupling the shoe 710 to the tool 714.

In the illustrated embodiment, the wire frame shoe 710 is formed from a continuous metal pipe or wire. Ends of the shoe 710 define the posts 734 for coupling the shoe 710 to the tool 714. Each of the posts 734 extends away from the tool 714 at an angle to a generally flat portion that defines a bottom portion 746 of the shoe 710. The wire then bends at approximately 90 degrees (although in other embodiments the angle may be greater or smaller) upward from the bottom portion 746 to form side members 754 of the shoe. The shoe 710 provides the guiding surface 730 on a workpiece side 762 of the side members 754 for positioning the shoe 710 relative to the workpiece. At a top of the side members 754, the wire bends approximately 90 degrees towards the tool 714 to define a top portion 750 of the tool, and the top portion 750 is connected by an intermediate section 752 of the wire. The shoe 710 defines an opening 758 between the side members 754 to allow the saw blade 722 to pass therethrough. The opening 758 may be any shape configured to receive the saw blade 722. In another embodiment, the wire frame shoe may be reversed so a top portion connects to the tool rather than a bottom portion.

The wire frame shoe 710 is manufactured of metal; however, in other embodiments, the shoe may be manufactured from plastic or similar material. The shoe 30 is manufactured via a bending operation; however, in other embodiments, the shoe may be formed from other manufacturing methods.

Referring to FIGS. 13-16, a shoe accessory 766 is used with the shoe 710 to provide a modified guiding surface 768. The shoe accessory 766 snaps on, or otherwise couples to, the shoe 710 to surround at least the guiding surface 730 and the workpiece side 762 such that in operation only the shoe accessory 766 engages the workpiece. The shoe accessory 766 includes a main portion 769, a bottom wall 770, a top wall 772, and sidewalls 774 extending between the bottom and top walls 770, 772. The walls of the shoe accessory 766 function similarly to the main portion 42, bottom wall 46, top wall 50, and sidewalls 54a, 54b of the shoe 30 shown and described with respect to FIG. 1.

The bottom wall 770 is located on one end of the main portion 769 opposite the top wall 772. The bottom wall 770 provides an additional surface to enable positioning of the shoe 710 against the workpiece. The top wall 772 extends in a direction toward the tool 714 to provide a grip for a user. The user may grip the shoe accessory 766 at the top wall 772 to enable better positioning of the tool against the workpiece. The top wall 772 and the bottom wall 770 also provide a grip location for a user when coupling and decoupling the shoe accessory 766 from the shoe 710.

Figure 13:
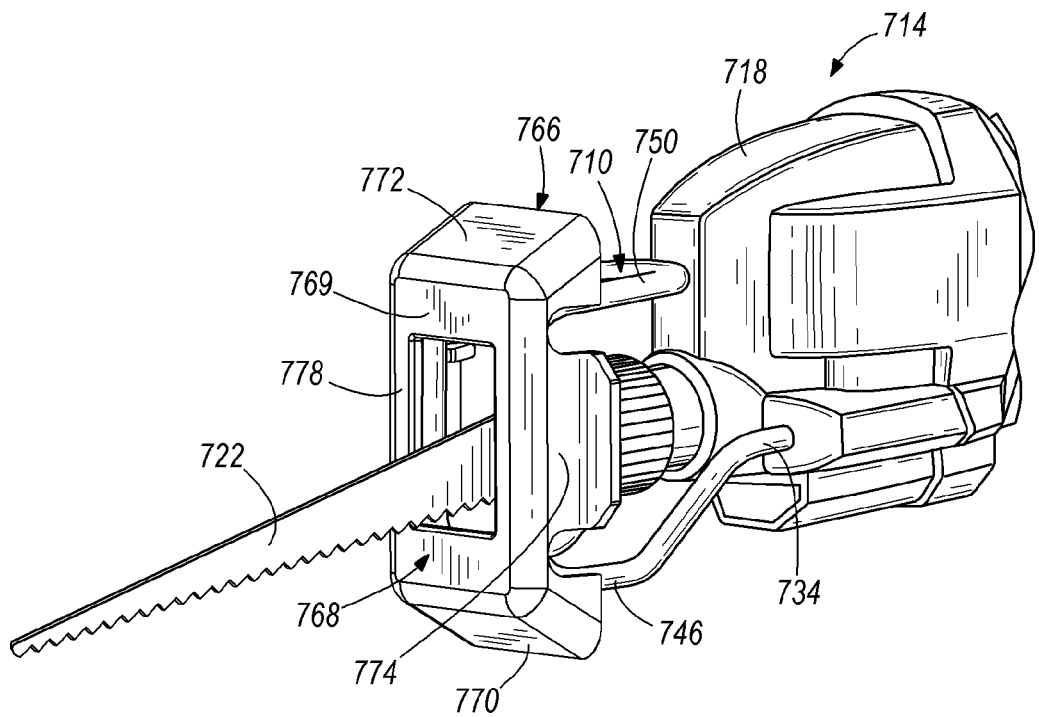
FIG. 13 is a front perspective of the reciprocating saw of FIG. 12 including a shoe accessory according to another embodiment of the invention.
Figure 14:
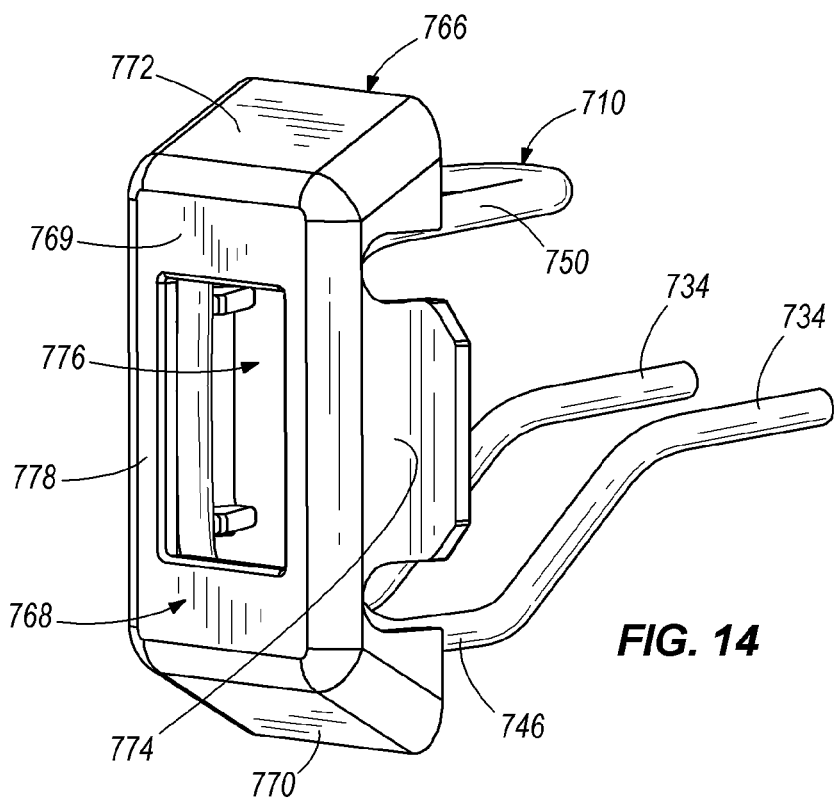
FIG. 14 is a front perspective of the shoe assembly of FIG. 12 including the shoe accessory of FIG. 13.

As shown in FIGS. 13-14, and similar to the shoe 30 of FIG. 1, the main portion 769 of the shoe accessory 766 includes an opening 776 that receives the saw blade 722. Opening 776 corresponds to and aligns with opening 758 of the shoe 710 to allow the saw blade 722 to pass through. The opening 776 may be any shape configured to receive the saw blade 722. The main portion 769 further includes a workpiece side, or face, 778 configured to be positioned proximate the workpiece and a tool side, or face, 780 (FIGS. 15-16) opposite the workpiece side, or face, 778. The tool side 780 includes a rear surface that faces the guiding surface 730 of the shoe 710.

The shoe accessory 766 provides the guiding surface 768 on the workpiece side 778 for using the shoe 710 in relation to the workpiece. The guiding surface 768 differs from the guiding surface 730 of the shoe 710. The workpiece side 778 of the main portion 769 has a planar surface that provides more surface area for engaging the workpiece, which constitutes a characteristic that distinguishes the guiding surface 768 provided by the shoe accessory 766 from the guiding surface 730 provided by the shoe 710. Further, the shoe accessory 766 provides additional surfaces for engaging the workpiece that are angled differently than the bottom portion 746 and the top portion 750 of the shoe 710, such as the bottom wall 770 and the top wall 772, respectively, which also constitute a guiding surface. Thus, the shoe accessory 766 provides a modified guiding surface.

The shoe accessory 766 is formed of plastic to prevent burring or other marking of the workpiece. However, in other embodiments, the shoe accessory 766 may be comprised of metal or similar material. The shoe accessory 766 is formed by molding or other manufacturing methods.

Figure 15:
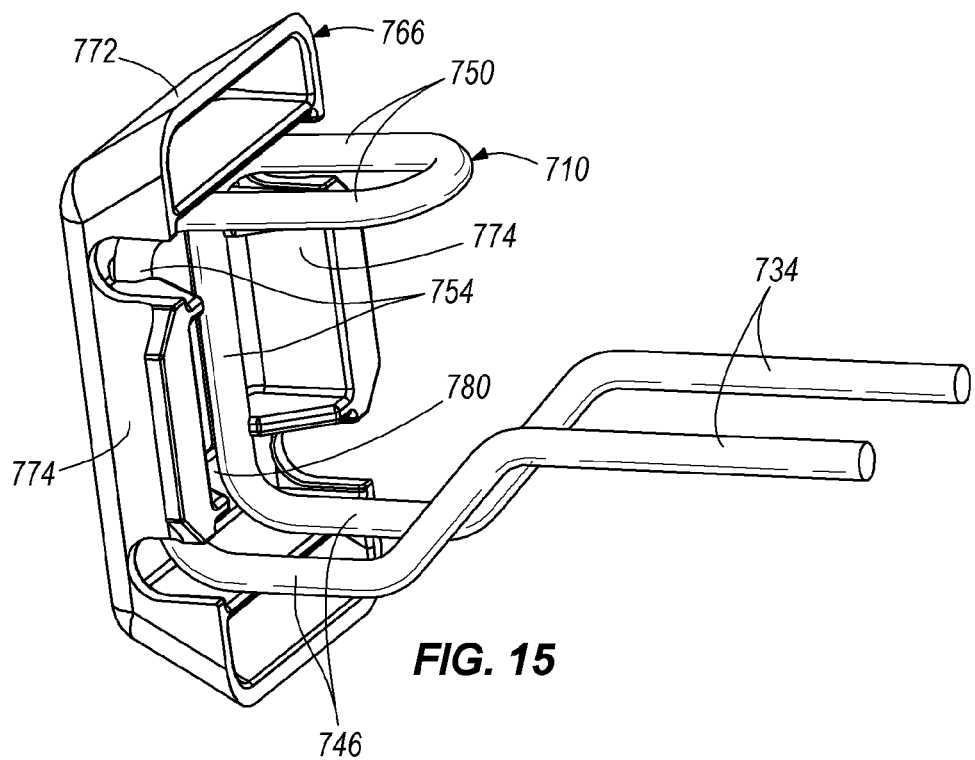
FIG. 15 is a rear perspective view of the shoe assembly of FIG. 12 including the shoe accessory of FIG. 13.
Figure 16:
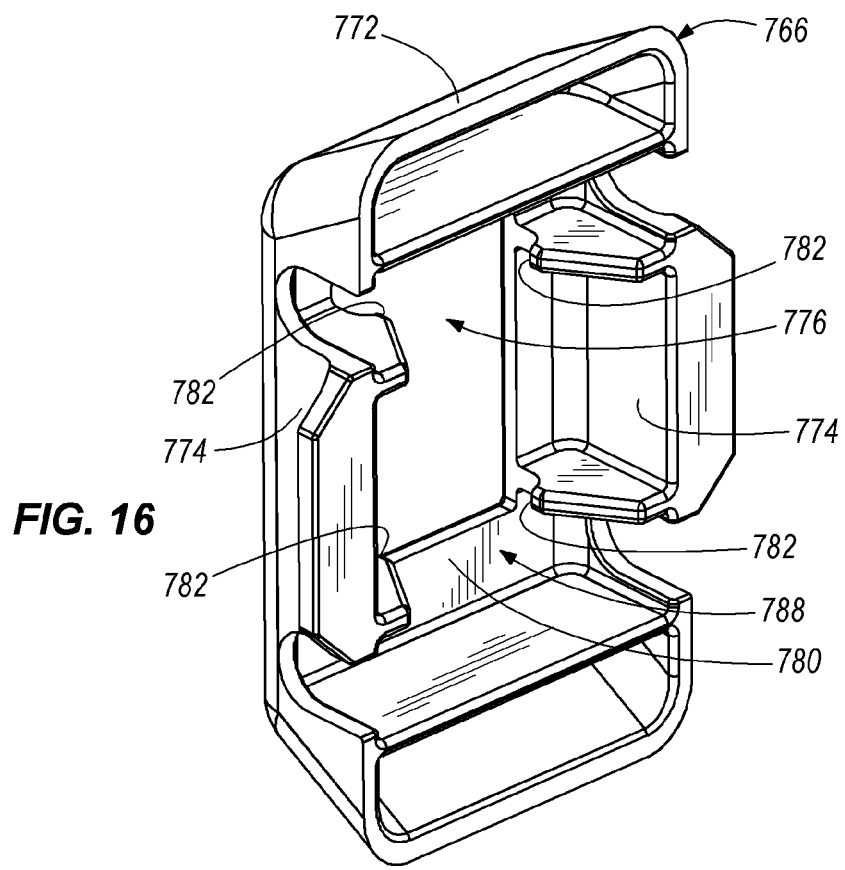
FIG. 16 is a rear perspective view of the shoe accessory of FIG. 13.
Figure 17:
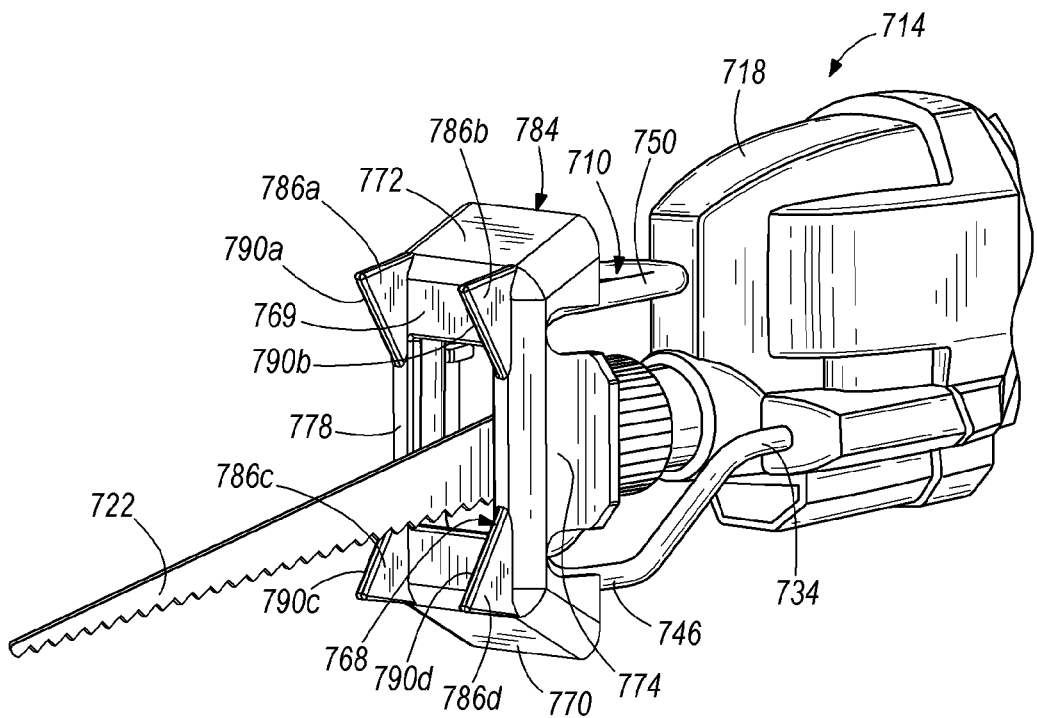
FIG. 17 is a front perspective of the reciprocating saw of FIG. 12 including another shoe accessory according to another embodiment of the invention.
Figure 18:
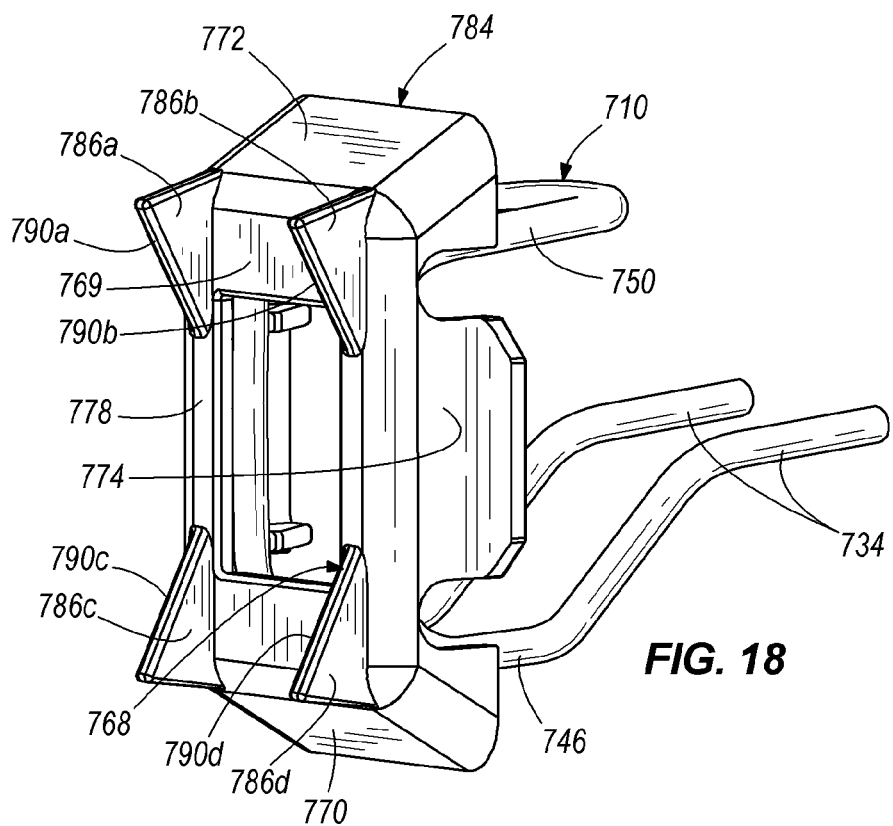
FIG. 18 is a front perspective of the shoe assembly of FIG. 12 including the shoe accessory of FIG. 17.

FIG. 15 shows a rear perspective view of the shoe accessory 766 coupled to the wire frame shoe 710, and FIG. 16 shows a rear perspective view of the shoe accessory 766 alone. The shoe accessory 766 includes a pair of projections 782 extending inwardly from each of the side walls 774 toward a space 788 rearward of the opening 776. The projections 782 engage, or abut, the side members 754 of the shoe 710 on a rearward side of the side members 754. A front side of the side members, i.e., the guiding surface 730, engages, or abuts, the tool side 780 of the shoe accessory 766. Thus, the projections 782 retain the shoe accessory 766 on the shoe 710 by extending over the side members 754 of the shoe 710 and securing the side members 754 between the projections 782 and the tool side 780 of the shoe accessory 766.

FIGS. 17-20 illustrate a shoe accessory 784 for the shoe 710 according to another embodiment of the invention. The shoe accessory 784 includes similar structure to the shoe accessory 766 illustrated in FIGS. 13-16 and described above; therefore, like structure is identified by the same reference numeral. In addition to including the features of the shoe accessory 766, the shoe accessory 784 also includes projections 786a, 786b, 786c, 786d extending from the workpiece side, or face, 778 and away from the tool 714. In the illustrated construction, four projections 786a, 786b, 786c, 786d, or sidewalls, are arranged proximate four corners of the opening 776. Two projections 786a, 786b are positioned in parallel proximate the top wall 772, or a top edge, and two more projections 786c, 786d are positioned proximate the bottom wall 770, or a bottom edge, parallel with and opposite the projections 786a, 786b.

The projections 786a, 786b, 786c, 786d of the shoe accessory 784 are configured to center a pipe or workpiece during the cutting operation, similar to the shoe 514 illustrated in FIG. 10. The projections 786a, 786b, 786c, 786d provide pairs of opposed inclined surfaces 790a, 790b, 790c, 790d that intersect the workpiece side, or face, 778 for engaging and centering a pipe or other workpiece therebetween. Opposed inclined surfaces 790a, 790c and 790b, 790d along with the intermediate main portion 769 define a partial V-shaped surface for engaging and centering a pipe or other workpiece. In other embodiments, the sidewalls may be rounded or have another shape configured for providing a centering or similar positioning function. The projections 786a, 786b, 786c, 786d provide the guiding surface 768, which differs from the guiding surface 730 of the shoe 710. The projections 786a, 786b, 786c, 786d constitute a characteristic that distinguishes the guiding surface 768 provided by the shoe accessory 784 from the guiding surface 730 provided by the shoe 710. Thus, the shoe accessory 784 provides a modified guiding surface.

The shoe accessory 784 is formed of plastic to prevent burring or other marking of the workpiece. However, in other embodiments, the shoe accessory 784 may be comprised of metal or similar material. The shoe accessory 784 is formed by molding or other manufacturing methods.

Figure 19:
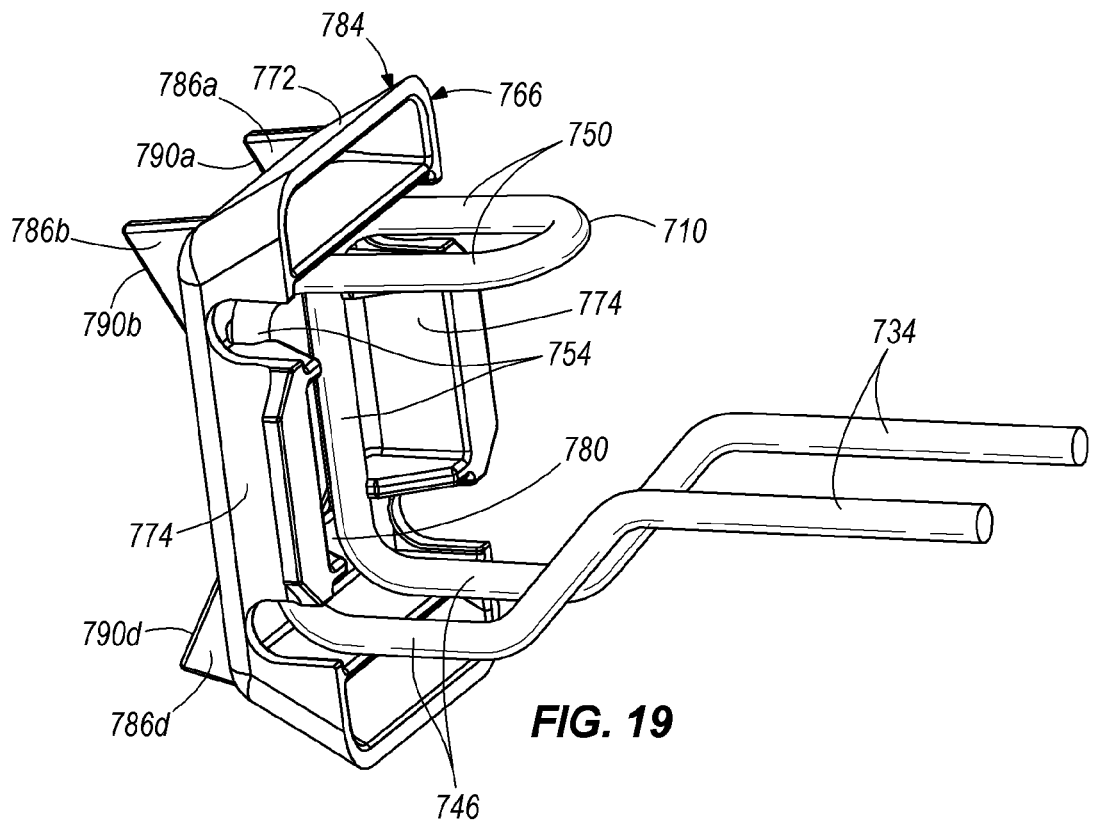
FIG. 19 is a rear perspective view of the shoe assembly of FIG. 12 including the shoe accessory of FIG. 17.
Figure 20:
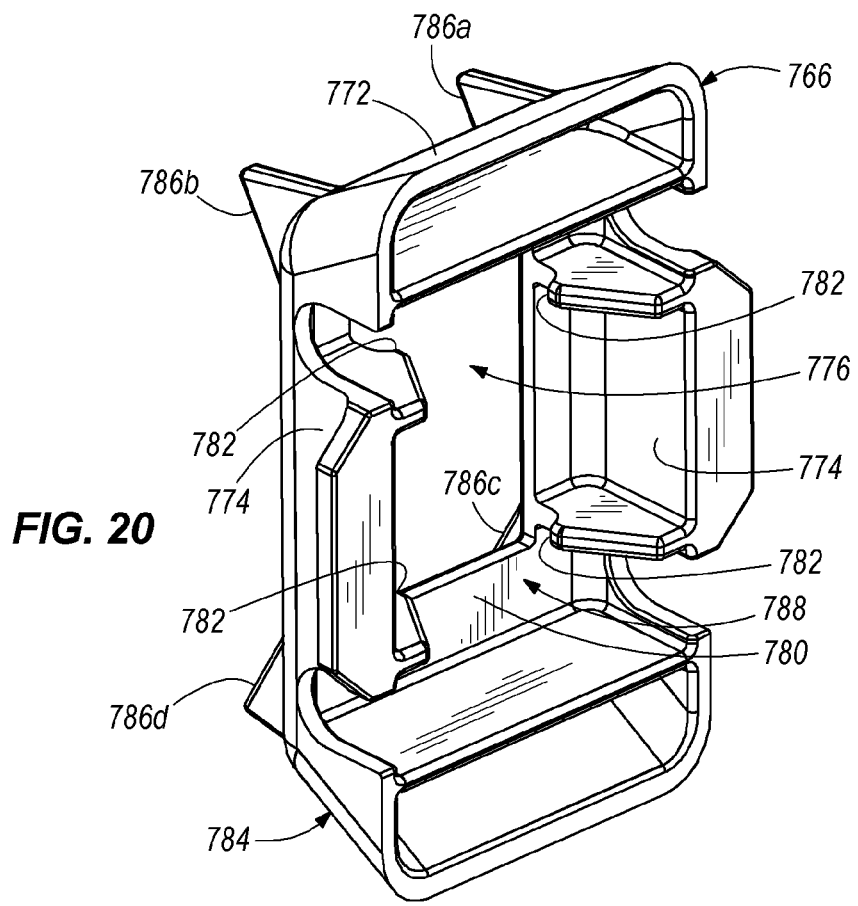
FIG. 20 is a rear perspective view of the shoe accessory of FIG. 17.

FIG. 19 shows a rear perspective view of the shoe accessory 784 coupled to the wire frame shoe 710, and FIG. 20 shows a rear perspective view of the shoe accessory 784 alone. The shoe accessory 784 includes a pair of projections 782 extending inwardly from each of the side walls 774 toward a space 788 rearward of the opening 776. The projections 782 engage the side members 754 of the shoe 710 on a rearward side of the side members 754. A front side of the side members, i.e., the guiding surface 730, engages the tool side 780 of the shoe accessory 784. Thus, the projections 782 retain the shoe accessory 784 on the shoe 710 by extending over the side members 754 of the shoe 710 and securing the side members 754 between the projections 782 and the tool side 780 of the shoe accessory 784.

In operation, a user snaps the shoe accessory 766, 784 to the wire frame shoe 710, causing the projections 782 to extend over the side members 754 of the shoe 710 and retain the side members 754 between the projections 782 and a surface on the tool side 780 of the accessory 766, 784. For removal, a user grips the tool side 780 of the top wall 772 and/or the bottom wall 770 and provides a force suitable for disengaging the inward projections 782 from the side members 754.

In other constructions, the workpiece side of the shoe accessory 766, 784 may include other types of guiding surfaces, such as the teeth 94a, 94b described above with respect to FIGS. 2-5, the cover layer 418 described above with respect to FIG. 9, and others.

Figure 21:
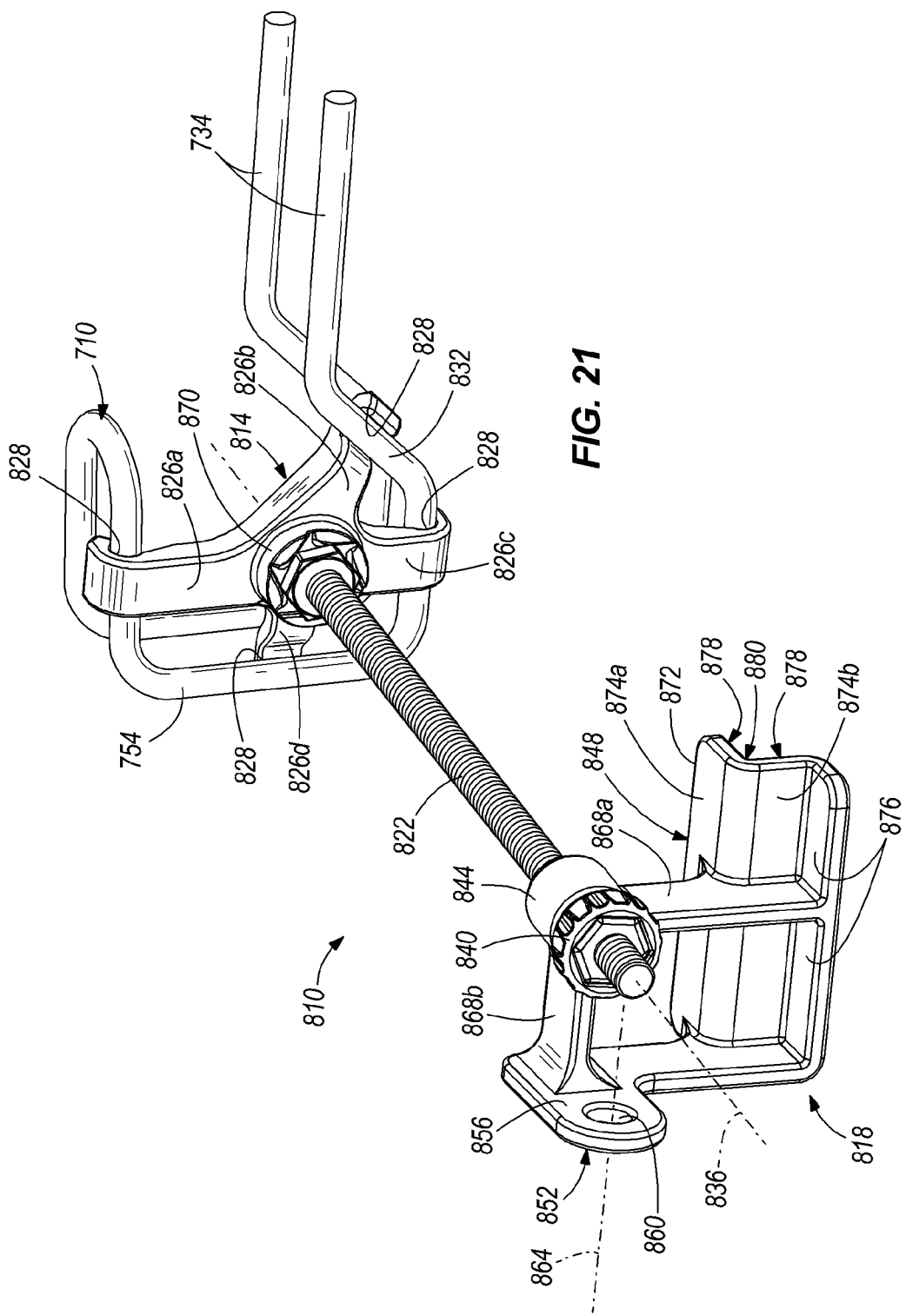
FIG. 21 is a rear perspective view of the shoe assembly of FIG. 12 including a circle and edge guide according to another embodiment of the invention.

FIG. 21 illustrates a circle and edge guide 810, or accessory guide, which removably couples to the wire frame shoe 710 of the reciprocating saw 714. The guide 810 includes a shoe attachment portion 814, a positioning portion 818, and a threaded shaft 822 connecting the shoe attachment portion 814 to the positioning portion 818 such that the positioning portion 818 is rotatable relative to the shaft 822, and thus relative to the attachment portion 814.

The shoe attachment portion 814 includes arms 826a, 826b, 826c, 826d extending outwardly from central portion 870 of the attachment portion 814. The arms 826a-826d provide a snap-fit connection between the attachment portion 814 and the shoe 710. Each of the arms 826a-826d includes a snap recess 828 for engaging the wire frame shoe 710. The first arm 826a engages a top of the top portion 750 of the shoe 710. The second arm 826b engages an inner side of an inclined portion 832 of the shoe 710, which is located angularly between each of the posts 734 and the bottom portion 746. In the illustrated embodiment, the second arm 826b is positioned at a non-perpendicular angle between the first and third arms 826a, 826c. The third arm 826c engages a bottom of the bottom portion 746 of the shoe 710, opposite the first arm 826a. The fourth arm 826d engages the side member 754 between the bottom portion 746 and the top portion 750. In the illustrated construction, the fourth arm 826d extends from the central portion 870 opposite the first arm 826b, and is positioned perpendicularly between the first arm 826a and the third arm 826c.

In the illustrated construction, four outwardly extending arms 826a, 826b, 826c, 826d are employed. In other constructions, a different number of arms may be arranged in a suitable fashion to couple the shoe attachment portion 814 to the shoe 710, or the arms may be arranged at different angles. In other constructions, other configurations and arrangements are possible for securing the positioning portion 818 relative to the tool 714. In still other constructions, the shoe attachment portion 814 may have a shape or construction for attachment to other types of shoes, such as the shoe 30 shown in FIG. 1.

The shaft 822 defines a central axis 836 and is coupled to the central portion 870 of the shoe attachment portion 814 at a first axial end such that the arms 826a, 826b, 826c, 826d extend outwardly therefrom in a plane generally normal to the axis 836. The shoe attachment portion 814 is fixedly coupled to the shaft 822 such that the shaft 822 does not rotate relative thereto. The shaft 822 is coupled to the positioning portion 818 at a second axial end by way of a bushing 844 such that the positioning portion 818 is free to rotate relative to the shaft 822. A knob 840 is provided adjacent the second axial end of the shaft 822 to locate the positioning portion 818 at one of a plurality of axial locations along a length of the shaft 822 with respect to the attachment portion 814. The knob 840 includes a threaded inner surface that engages the threaded shaft 822 and is rotatable about the threaded shaft 822 for axial movement with respect to the shaft 822. The knob 840 abuts the positioning portion 818, which is axially translatable and free to rotate with respect to the shaft 822, thus causing axial movement of the positioning portion 818 along the shaft 822 and acting as a stop to limit the axial position of the positioning portion 818 relative to the shaft 822. In other constructions, the shoe attachment portion 814 is rotatably coupled to the shaft 822 by way of a bushing.

The positioning portion 818 includes an edge guide 848 and a circle guide 852. The edge guide 848 includes a flange 872 having a bend defining first and second planar flange portions 874a, 874b angled approximately 90 degrees apart. The joint of the first and second planar flange portions 874a, 874b defines an edge 880 that engages an edge of a workpiece. Each of the planar flange portions 874a, 874b include a guide surface 878 that slides along the workpiece as a cut is being performed with the tool 714 to ensure that the cut is made at a consistent distance from the edge of the workpiece.

The circle guide 852 includes a flange 856 having an aperture 860 defining a central axis 864, which is generally perpendicular to the central axis 836 of the shaft 822. In the illustrated construction, the central axis 864 of the aperture 860 lies generally parallel to the edge 880 defined between the first and second planar flange portions 874a, 874b. However, in other constructions, the aperture 860 may be located on a different section of the positioning portion 818. For example, the aperture 860 may be located such that the central axis 864 of the aperture 860 is perpendicular to the edge 880 defined between the first and second planar flange portions 874a, 874b. In such constructions, the aperture 860 may be located, for example, on a third flange portion 876 extending away from the second planar flange portion 874b in a direction generally parallel to the first planar flange portion 874a.

The flange 856, or another flange having the aperture 860, is configured to engage a nail, or other fastener or projection (not shown), in the workpiece by way of the aperture 860 such that the tool 714 is rotatable about the central axis 864 to make a circular cut, whereby the central axis 864 defines a center point of the circular cut. The positioning portion 818 includes support arms 868a, 868b extending radially from the bushing 844 and connected to the edge guide 848 and circle guide 854, respectively.

The shoe attachment portion 814 and the positioning portion 818 are formed of a metal by a suitable manufacturing method, such as casting. In other constructions, the shoe attachment portion 814 and the positioning portion 818 may be formed of another suitable material, such as plastic, by other suitable manufacturing methods, such as injection molding.

In other embodiments, the circle and edge guide 810 can be configured to attach to other types of saws including other reciprocating saws, jigsaws, and the like.

In operation, a user places the edge guide 848 on a workpiece edge and operates the tool 714. The edge 880 is aligned with and engages the workpiece edge. The user rotates the tool 714 about the axis 836 of the shaft 822 and into engagement with the workpiece to make a cut while sliding the edge guide 848 along the workpiece edge; thus, the cut is made at a consistent distance from the workpiece edge. The distance from the workpiece edge can be adjusted by moving the positioning portion 818 to another location along the shaft 822. The user rotates the knob 840 in a first direction to move the positioning portion 818 axially with respect to the shaft 822 toward the attachment portion 814. The user rotates the knob 840 in a second direction, opposite the first direction, to move the positioning portion 818 axially with respect to the shaft 822 away from the attachment portion 814.

To cut a circle in the workpiece, the user adjusts the axial position of the positioning portion 818 relative to the shaft 822, as described above, depending upon a radius of the desired circle. The user places the circle guide 852 over a fastener or other projection on the workpiece such that the fastener or other projection enters the aperture 860. The user rotates the tool 714 about the axis 836 of the shaft 822 toward the workpiece and into engagement with the workpiece to make a cut. Using the aperture 860 as a pivot point, the user rotates the guide 810 and the tool 714 about the aperture 860, and thus the axis 864, to make a circular cut. The radius of the circle is equal to the distance from the saw blade 722 (i.e., a plane of symmetry of the shoe 710) to the central axis 864 of the aperture 860 and is adjusted by locating the positioning portion 818 on the shaft 822 at a location corresponding to a desired radius.

Figure 22:
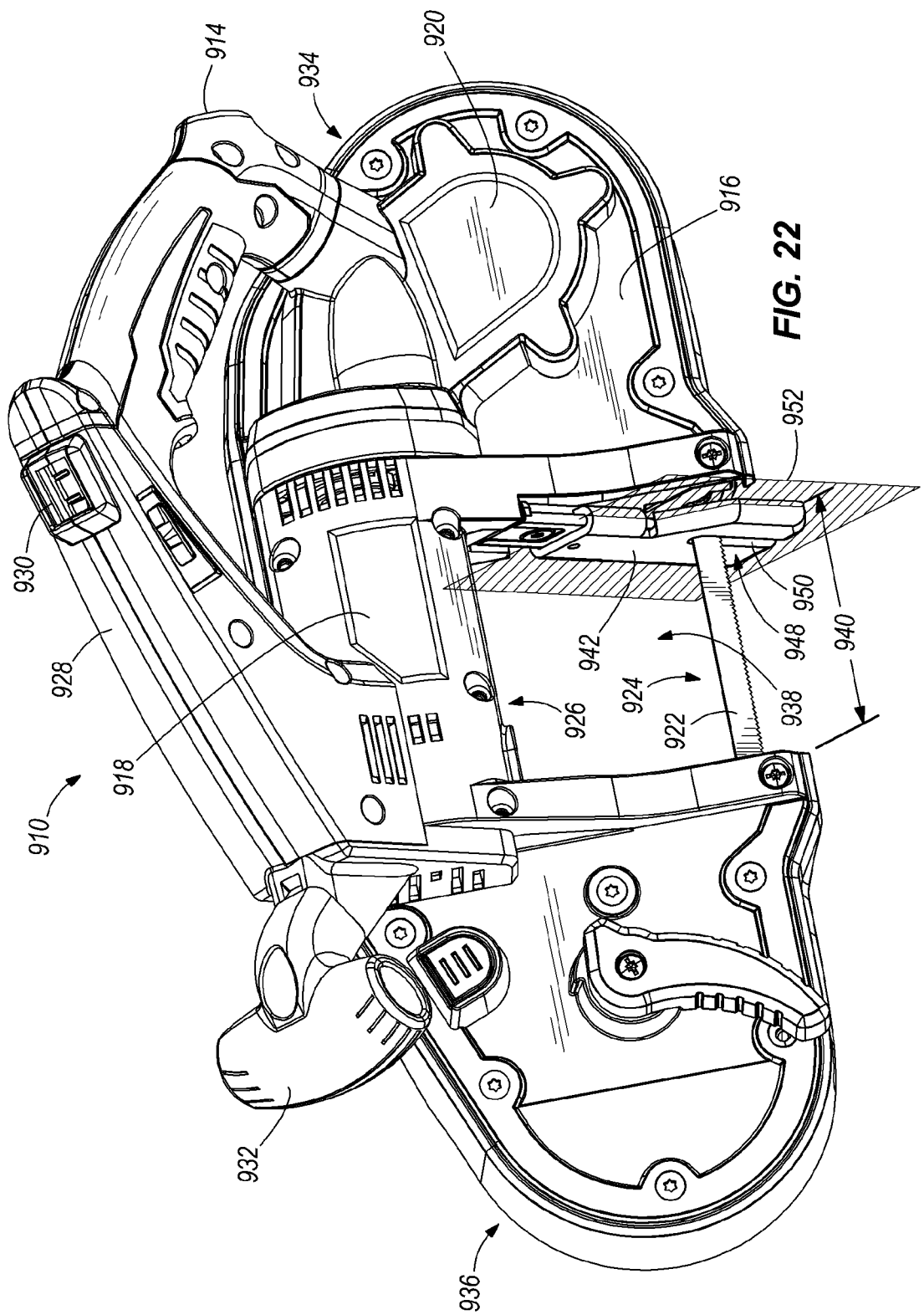
FIG. 22 is a perspective view of a band saw having a workpiece bumper.
Figure 22A:
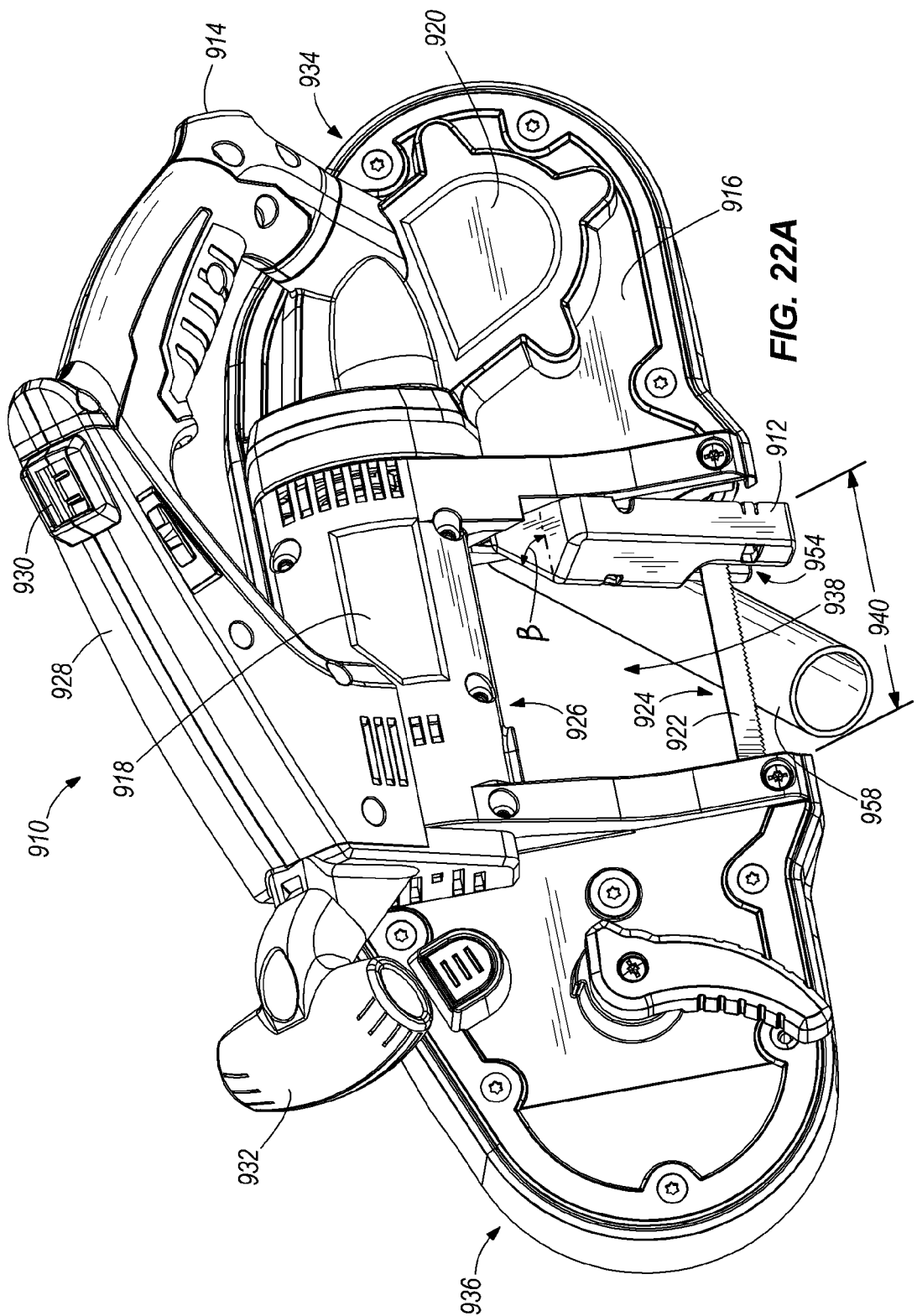
FIG. 22A is a perspective view of the band saw of FIG. 22 including an angle guide according to one embodiment of the invention and a workpiece.

FIGS. 22 and 22A illustrate a band saw 910 and an angle guide 912 (FIG. 22A) embodying some aspects of the invention. The illustrated band saw 910 is an AC version having an electrical cord connection 914; however, in further embodiments, DC versions of the band saw 910 including a rechargeable, removable battery pack are possible.

The band saw 910 includes a housing or frame 916 supporting a motor 918 and a gear box 920. The motor 918 is drivingly connected to a drive mechanism (not shown) at least partially housed within the gear box 920. The motor 918 and the drive mechanism are operable to drive a continuous band saw blade 922 to cut a workpiece. As described herein, the band saw 910 includes a front 924 and a rear 926. The front 924 is defined as the side being proximate the portion of the band saw blade 922 that cuts the workpiece and the rear 926 is defined as the side proximate the portion of the band saw blade 922 that does not cut the workpiece. The rear 926 is otherwise described as being opposite the front 924.

The housing 916 includes a main handle 928 supporting a switch assembly 930 to provide power to the band saw 910. The switch assembly 930 is operable to control operation of the motor 918. The band saw 910 also includes an auxiliary handle 932 for a user's other hand. Generally, the handles 928, 932 are shaped and arranged for two-handed operation of the band saw 910 as the workpiece is cut. In the illustrated construction, each handle 928, 932 has an ergonomic design to provide comfortable gripping and controlled operation of the band saw 910.

The housing 916 includes a first portion 934 and a second portion 936. The first portion 934 and the second portion 936 are spaced apart from one another and define a U-shaped cavity 938 defining a cut zone 940 therebetween. The drive mechanism generally includes a drive wheel pulley and a driven wheel pulley. The drive wheel rotates about a drive wheel axis defined by a drive wheel axle and is drivingly connected to the motor 918 via a drive train. The driven wheel rotates about a driven wheel axis defined by a driven wheel axle and is rotatably supported by the housing 916. The drive wheel is positioned in the first portion 934 of the housing 916, and the driven wheel is positioned in the second portion 936 of the housing 916. A wheel tire is coupled to each of the peripheries of the drive wheel and the driven wheel. Each wheel tire is a circular-shaped ring formed of a soft and/or flexible elastomeric material that is able to lock or adhere to the respective wheel. The band saw blade 922 extends around the drive wheel and the driven wheel and grips the tires and, as a result, motion from the drive wheel is transmitted to the band saw blade 922 via the tires.

The band saw 910 also includes a workpiece bumper 942, or shoe, for positioning against the workpiece. The workpiece bumper 942 is coupled to the housing 916 by way of a plurality of fasteners (not shown) that pass through apertures 946 (FIGS. 23-23C) in the workpiece bumper 942 and into the housing 916.

The workpiece bumper 942 includes a workpiece-engaging surface 948 (FIG. 22). The bumper 942, and in particular the workpiece-engaging surface 948, engages a workpiece 958 in order to secure the workpiece relative to the band saw blade 922 within the cut zone 940 during a cutting operation. The workpiece bumper 942 includes a U-shaped groove or slot 950 in which the band saw blade 922 is positioned. The direction of movement of the band saw blade 922 through the slot 950 is generally perpendicular (i.e., substantially 90 degrees) to a plane 952 (FIG. 22) defined by the workpiece-engaging surface 948.

Figure 23:
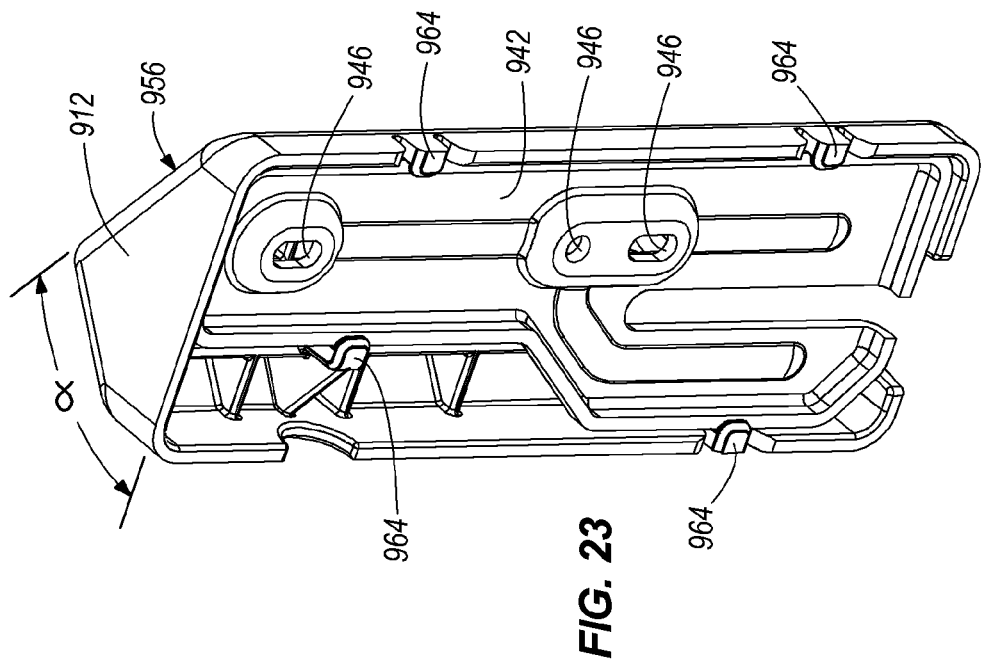
FIG. 23 is a rear perspective view of the workpiece bumper of FIG. 22 and the angle guide of FIG. 22A.
Figure 23A:
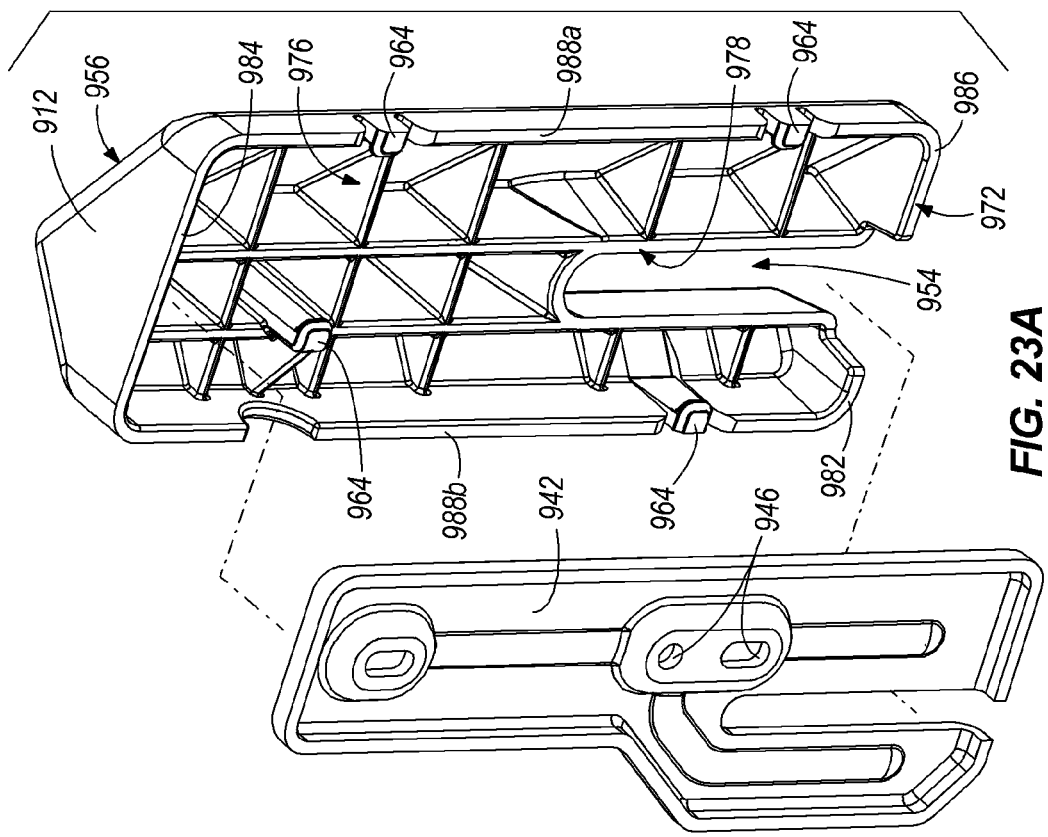
FIG. 23A is an exploded view of the workpiece bumper and the angle guide of FIG. 23.
Figure 24:
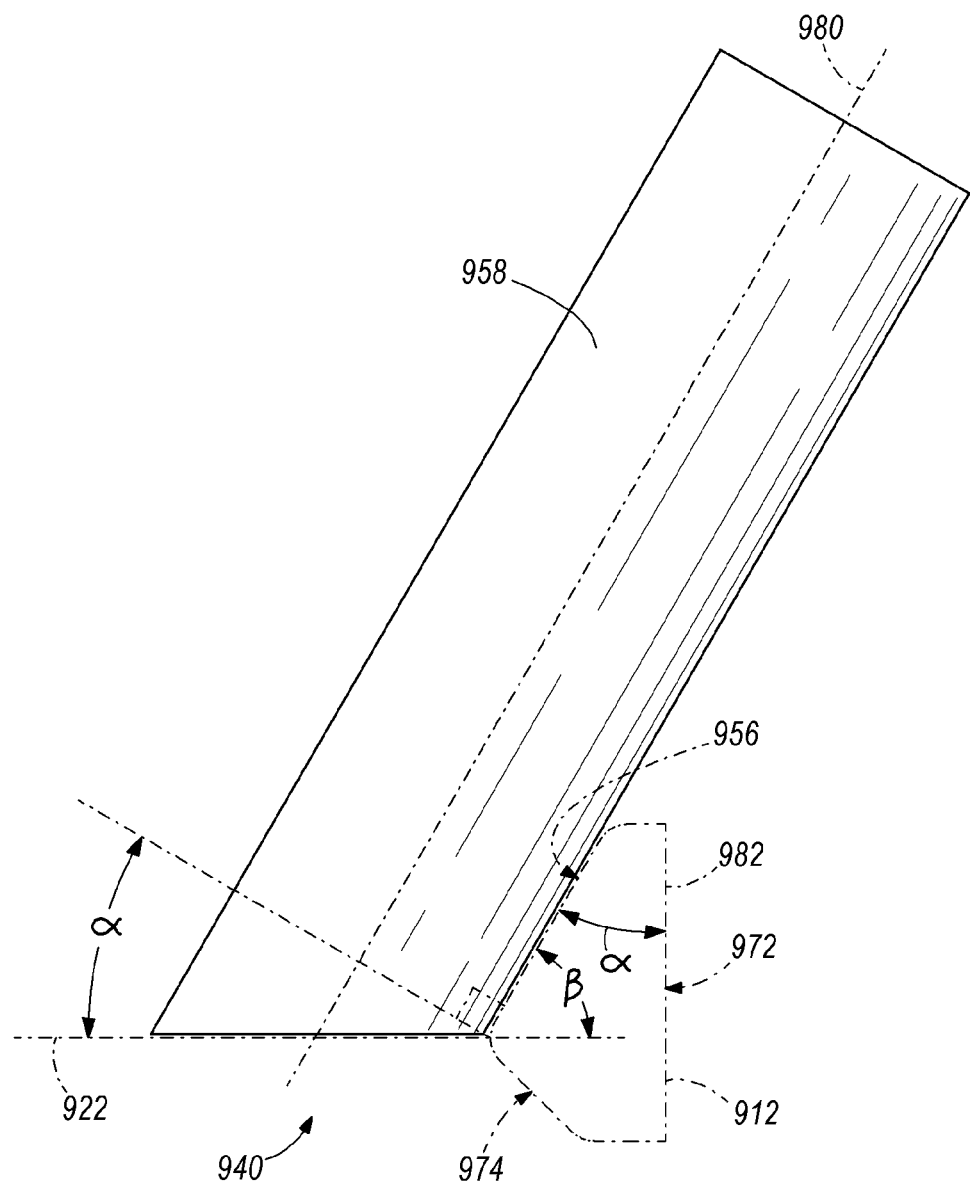
FIG. 24 is a top view of the angle guide (phantom) and the workpiece of FIG. 22.

As shown in FIGS. 22A, 23, 23A and 24, the angle guide 912 is coupled to the workpiece bumper 942 for providing a modified workpiece-engaging surface 956 that is positioned at an angle α with respect to a tool side edge 972 of the angle guide 912, and similarly, with respect to the workpiece-engaging surface 948 of the workpiece bumper 942 (i.e., the plane 952). In the illustrated embodiment, the workpiece-engaging surface 956 is non-parallel to the tool side edge 972 and the plane 952. The angle guide 912 allows a user to make an angled cut in the workpiece relative to a longitudinal axis 980 of the workpiece 958, as shown in FIG. 24, rather than a normal cut without the use of the angle guide 912 (i.e., with use of only the workpiece bumper 942). A cut angle of the workpiece is equal to angle α, which is defined by the workpiece-engaging surface 948 and the tool side edge 972 of the angle guide 912.

The tool side edge 972 is positioned adjacent the workpiece bumper 942 of the band saw 910 and lies generally in a plane that is parallel to the plane 952 of the workpiece-engaging surface 948 of the workpiece bumper 942. The workpiece-engaging surface 956 is not perpendicular to the direction of movement of the band saw blade 922 in the cut zone 940 (as is the workpiece-engaging surface 948 of the workpiece bumper 942). Rather, the workpiece-engaging surface 956 lies at an angle β with respect to the direction of movement of the saw blade 922 and with respect to the portion of the saw blade 922 that lies in the cut zone 940. The angle β is equal to 90−α. A second surface 974 defines a plane that is non-parallel to a plane defined by the workpiece-engaging surface 956. In some embodiments, the second surface 974 may be perpendicular to the workpiece-engaging surface 956.

FIGS. 23 and 23A illustrate a first construction of the angle guide 912 that couples to the workpiece bumper 942 by a snap engagement. The angle guide 912 includes a U-shaped groove or slot 954 that corresponds to and aligns with the slot 950 of the workpiece bumper 942. The angle guide 912 is positioned over the workpiece bumper 942 such that the saw blade 922 passes through the slot 954. The angle guide 912 includes inward projections 964 on a tool side 982 that removably snap around the workpiece bumper 942 between the workpiece bumper 942 and the housing 916 of the band saw 910. In the illustrated construction, four projections 964 are employed. In other constructions, fewer or more projections having the same or other orientations may be employed. The workpiece bumper 942 is secured in a space 976 between a top wall 984, a bottom wall 986, sidewalls 988a, 988b, and a retaining surface 978, which is recessed into the angle guide 912 with respect to the tool side edge 972. In the illustrated construction, the retaining surface 978 is defined by edges of a web structure that provide a surface for retaining the workpiece-engaging surface 948 of the workpiece bumper 942.

Figure 23B:
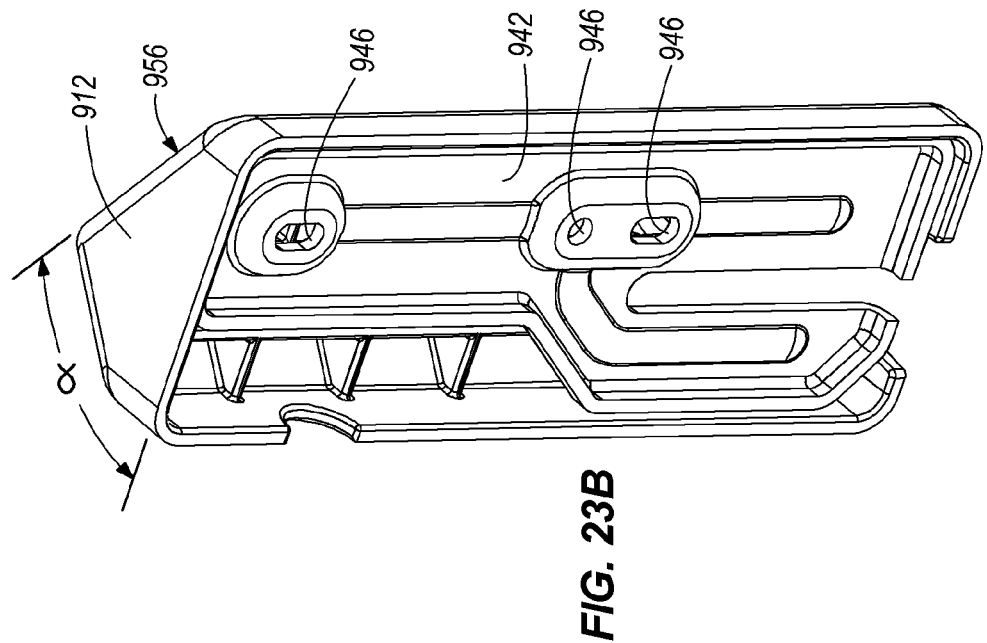
FIG. 23B is a rear perspective view of the workpiece bumper of FIG. 22 and an angle guide according to another embodiment of the invention.
Figure 23C:
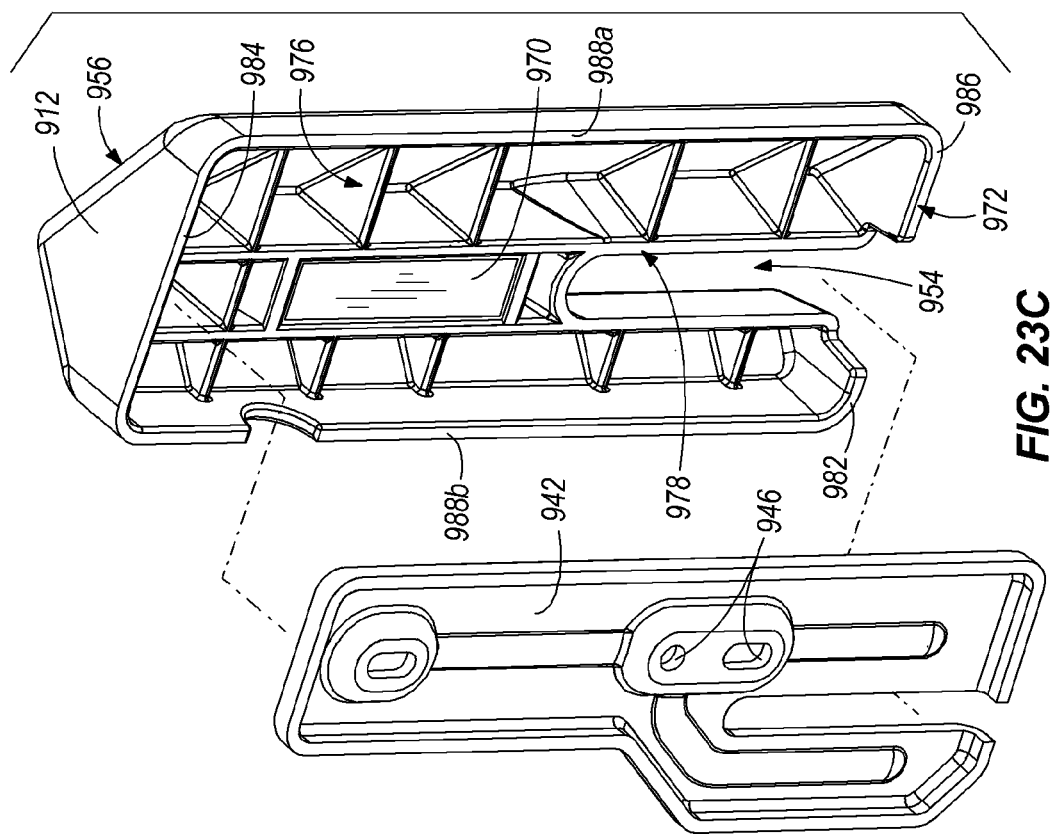
FIG. 23C is an exploded view of the workpiece bumper and the angle guide of FIG. 23B.

FIGS. 23B and 23C illustrate a second construction of an angle guide 968 that is substantially similar to the angle guide 912 except for having one or more magnets 970 fixedly coupled to a tool side 982 of the angle guide 968. The magnet 970 is employed, instead of projections 964, to couple the angle guide 968 to the workpiece bumper 942. The magnet 970 engages the workpiece bumper 942, which is preferably made of steel or another ferromagnetic material in this construction, to couple the angle guide 968 to the workpiece bumper 942. In the illustrated construction, one magnet 970 is shown; however, in other constructions, two or more magnets may be arranged on the angle guide 968 to couple the angle guide 968 to the workpiece bumper 942.

Figure 25:
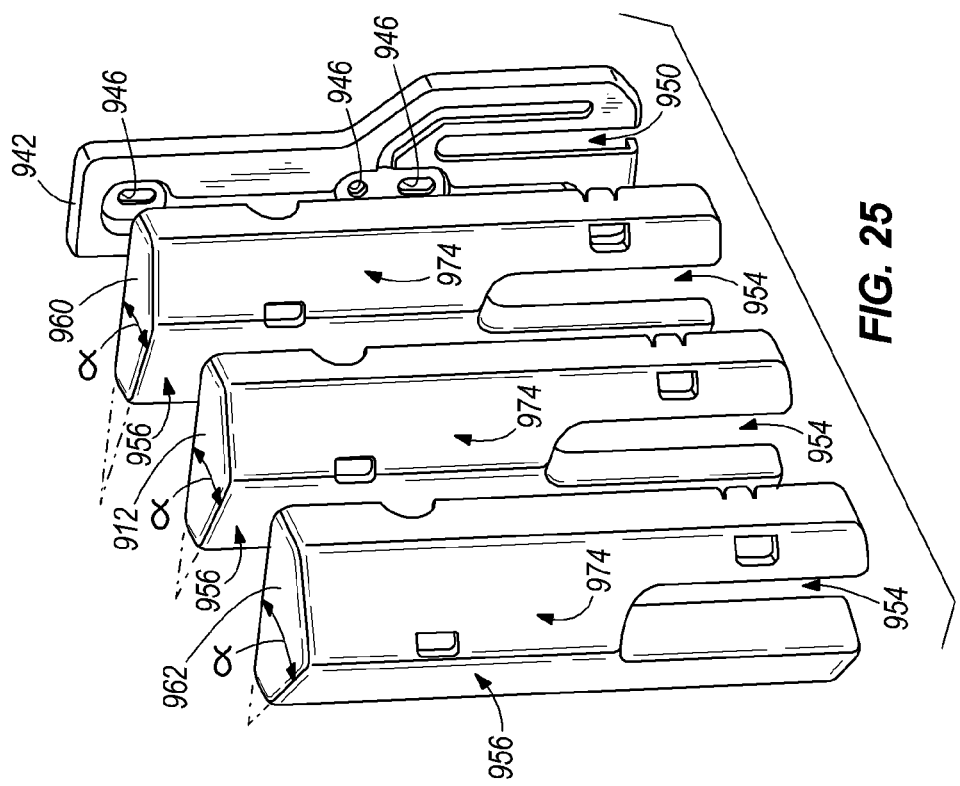
FIG. 25 is a perspective view of the workpiece bumper of FIG. 22, the angle guide of FIG. 22A, and other constructions of the angle guide.
Figure 26:
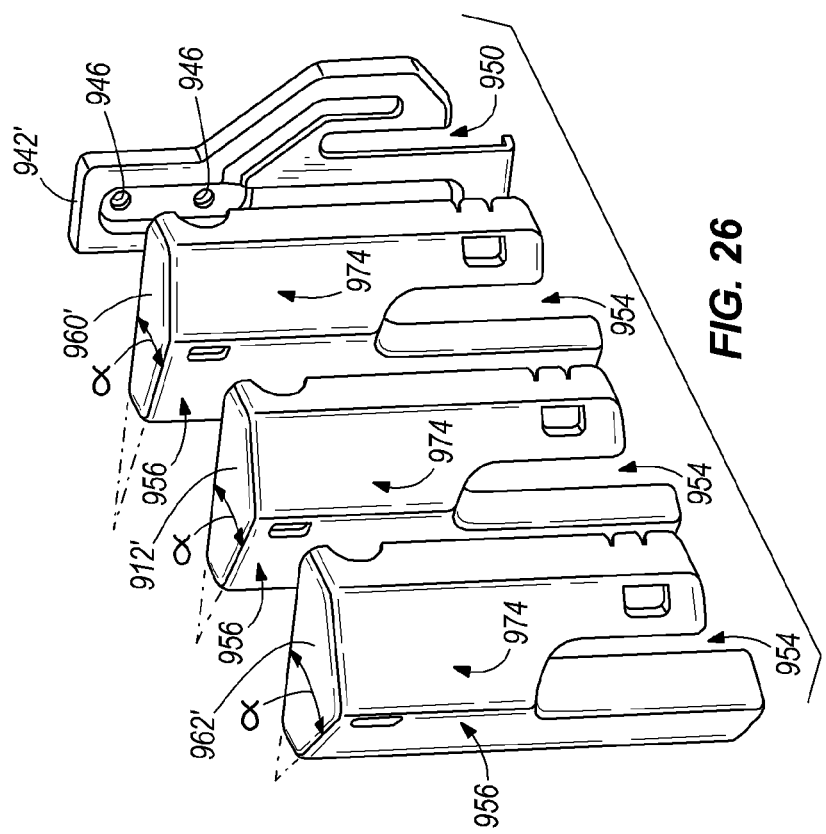
FIG. 26 is a perspective view of other constructions of the workpiece bumper of FIG. 22 and the angle guide of FIG. 22A.

In operation, as illustrated in FIG. 24, when the workpiece 958, such as a pipe, is positioned against the workpiece-engaging surface 956 of the angle guide 912, a cut is made on the workpiece 958 at the angle α with respect to a normal cut, which is made when the workpiece-engaging surface 948 of the workpiece bumper 946 is used. In the illustrated constructions of FIGS. 22A-24, the angle α is approximately 30 degrees and the angle β is approximately 60 degrees. In other constructions, the angles α and β may have other values corresponding to a desired cut angle for the workpiece. For example, as illustrated in FIG. 25, other constructions include a second angle guide 960 having a angle α of approximately 22.5 degrees, and a third angle guide 962 having an angle α of approximately 60 degrees. FIG. 26 illustrates another construction having fourth, fifth and sixth angle guides 912', 960' and 962', respectively, sized and shaped to be used with a compact workpiece bumper 942' configured for a compact band saw (not shown). Any of the angle guides may be provided with snaps 964, one or more magnets 970, or other coupling devices to be coupled to the workpiece bumper 942, 942'.

Although the invention has been described in detail with reference to certain preferred embodiments, variations and modifications exist within the scope and spirit of one or more independent aspects of the invention as described.

What is claimed is:

1. A power tool comprising:
 a main body including a motor configured to transfer motion to a cutting blade;
 a shoe extending from the main body, the shoe comprising,
  a first guiding surface for engaging a workpiece,
  a rear shoe surface generally opposite the first guiding surface,
  transverse shoe walls extending from the rear shoe surface, the transverse shoe walls having shoe ends, and
  an opening through which the cutting blade passes; and
 a shoe accessory comprising,
  a rear accessory surface facing the first guiding surface of the shoe,
  transverse accessory walls extending from the rear accessory surface, wherein at least one member extends from at least one of the transverse walls and over at least a portion of at least one of the shoe ends such that the shoe is received in a receptacle defined between the at least one member, the rear accessory surface, and the transverse accessory walls in a snap fitting manner such that at least a portion of the shoe ends are exposed, and
  a second guiding surface opposite the rear surface and for engaging the workpiece, the second guiding surface having at least one characteristic that differs from the first guiding surface.

2. The power tool of claim 1, wherein when the shoe accessory is coupled to the shoe, the first guiding surface is covered such that during operation of the power tool the second guiding surface engages the workpiece.

3. The power tool of claim 1, wherein the at least one characteristic includes a plurality of teeth arranged substantially in a row.

4. The power tool of claim 1, further comprising a grip extension extending from at least one of the transverse accessory walls.

5. The power tool of claim 4, wherein the grip extension extends away from the at least one transverse accessory wall in a direction generally opposite the at least one member.

6. The power tool of claim 1, wherein the at least one member includes a plurality of discrete projections extending from the transverse accessory walls, wherein the plurality of discrete projections cover at least portions of the shoe ends allowing the shoe accessory to be snap-fitted to the shoe.

7. The power tool of claim 1, wherein the receptacle is substantially cuboid-shaped.

8. The power tool of claim 1, wherein the at least one characteristic includes a first curved wall extending from one of the transverse accessory walls and a second curved wall extending from a second of the transverse accessory walls, the curved walls are adjacent to the second guiding surface and extend beyond a boundary of the second guiding surface allowing the curved walls to act as a pivot for the power tool.

9. The power tool of claim 1, wherein the at least one characteristic includes a pair of opposed projections extending from the second guiding surface of the shoe accessory, one of the projections positioned proximate a top edge of the shoe accessory, the other projection positioned proximate a bottom edge of the shoe accessory, and each of the projections including an inclined surface intersecting the second guiding surface, the inclined surface of one projection facing the inclined surface of the other projection, and further wherein the projections define an inclined portion of the second guiding surface of the shoe accessory for locating a workpiece having a curved surface with respect to the accessory.

10. A power tool comprising:
 a main body including a motor configured to transfer motion to a cutting blade;
 a shoe extending from the main body, the shoe comprising,
  a first guiding surface for engaging a workpiece,
  a rear shoe surface generally opposite the first guiding surface,
  transverse shoe walls extending from the rear shoe surface, the transverse shoe walls having shoe ends, and
  a first opening through which the cutting blade passes; and
 a shoe accessory comprising,
  a rear accessory surface facing the first guiding surface of the shoe,
  a second guiding surface opposite the rear surface and for engaging the workpiece, the second guiding surface having at least one characteristic that differs from the first guiding surface,
  a second opening through which the cutting blade passes, the second opening configured to align with the first opening when the shoe accessory is coupled to the shoe, and
  transverse accessory walls extending from the rear accessory surface, wherein at least one projection extends from at least one of the transverse accessory walls and covers at least a portion of at least one of the shoe ends such that the shoe is received in a receptacle defined between the at least one projection, the rear accessory surface, and the transverse accessory walls in a snap fitting manner where at least a portion of the shoe ends are exposed.

11. The power tool of claim 10, wherein the rear surface covers the first guiding surface when the shoe accessory is coupled to the shoe such that in operation the second guiding surface engages the workpiece.

12. The power tool of claim 10, wherein the at least one characteristic is a plurality of teeth arranged substantially in a row.

13. The power tool of claim 12, wherein the plurality of teeth are positioned proximate a portion of the second opening.

14. The power tool of claim 10, further comprising a grip extension extending from at least one of the transverse accessory walls.

15. The power tool of claim 14, wherein the grip extension extends away from the at least one transverse accessory wall in a direction generally opposite the at least one projection.

16. The power tool of claim 10, wherein the at least one characteristic includes a first curved wall extending from one of the transverse accessory walls and a second curved wall extending from a second of the transverse accessory walls, the curved walls are adjacent to the second guiding surface and extend beyond a boundary of the second guiding surface allowing the curved walls to act as a pivot for the power tool.

17. The power tool of claim 10, wherein the at least one projection includes a plurality of discrete projections extending from the transverse accessory walls, wherein the plurality of discrete projections cover at least portions of the shoe ends allowing the shoe accessory to be snap-fitted to the shoe.

18. The power tool of claim 10, wherein the receptacle is substantially cuboid-shaped.

19. The power tool of claim 10, wherein the at least one characteristic includes a pair of opposed projections extending from the second guiding surface of the shoe accessory, one of the projections positioned proximate a top edge of the shoe accessory, the other projection positioned proximate a bottom edge of the shoe accessory, and each of the projections including an inclined surface intersecting the second guiding surface, the inclined surface of one projection facing the inclined surface of the other projection, and further wherein the projections define an inclined portion of the second guiding surface of the shoe accessory for locating a workpiece having a curved surface with respect to the accessory.

\* \* \* \* \*